United States Patent [19]
Kaneko et al.

[11] Patent Number: 5,642,229
[45] Date of Patent: Jun. 24, 1997

[54] PROJECTION LENS UNIT

[75] Inventors: Toshihide Kaneko; Eiichi Toide, both of Nagaokakyo, Japan

[73] Assignee: Mitsubishi Denki Kabushiki Kaisha, Tokyo, Japan

[21] Appl. No.: 260,979

[22] Filed: Jun. 15, 1994

[30] Foreign Application Priority Data

Jun. 15, 1993 [JP] Japan ................................ 5-143523
Apr. 28, 1994 [JP] Japan ................................ 6-092508

[51] Int. Cl.$^6$ .............................................. G02B 3/00
[52] U.S. Cl. ........................... 359/649; 359/708; 359/754
[58] Field of Search ............................. 359/648, 649, 359/650, 651, 708, 754, 755, 757, 758, 784, 791

[56] References Cited

U.S. PATENT DOCUMENTS 4,300,817  11/1981  Betensky ............................ 350/412

FOREIGN PATENT DOCUMENTS 0167514   6/1990   Japan .

*Primary Examiner*—Georgia Y. Epps
*Assistant Examiner*—Dawn-Marie Bey

[57] ABSTRACT

A projection lens unit includes, in accordance with the order of disposition from a screen side, a first lens group including a positive meniscus lens, a second lens group including a double convex lens, and a third lens group which corrects curvature of field, wherein the third lens group has two concave lenses. A projection lens unit includes, in accordance with the order of disposition from a screen side, a first lens having a positive meniscus form, a second lens having a negative meniscus form, a third lens which is double-convex lens having a light gathering function, a fourth lens which is disposed near the third lens and is a double-convex lens having a positive power, a fifth lens provided at its central portion with a convex surface directed to a screen and provided at its peripheral portion with a concave portion directed to the screen, and a sixth lens having a concave surface directed to the screen, wherein each of the second, fourth and fifth lenses has at least one aspherical surface.

6 Claims, 33 Drawing Sheets

PROJECTION LENS UNIT

BACKGROUND OF THE INVENTION

1. Field of the Invention

The present invention relates to a projection lens unit used for projecting a high definition image in high definition televisions, computer displays and other devices.

2. Description of Related Art

In recent years, a manner in which a small image source is projected and enlarged by a projection lens unit is the mainstream of the measures for obtaining a large screen image of 40 inches or more. Projectors of this projection type are expected to be used in various kinds of fields including personal use and professional use. In particular, high definition images of 100-inch class are desired, for example, in presentation systems and monitoring systems, but requires projection lens units of a high performance.

There is a projector of a front projection type, which projects an image to a front side of a screen so that the screen image is watched in the same style as the moving picture. This projector of the front projection type requires several kinds of adjustment every time the location of the projector and/or the screen size are changed. Therefore, there has been demanded a projection lens unit which can comply with various screen sizes with the single projection lens unit and can be adjusted simply.

The projection lens unit used in the projector must have an F-number close to 1 in order to ensure a sufficient brightness of the projected image. Further, aberration correction must be sufficiently effected through the whole image. When the projection lens unit is formed of only glass lenses in order to obtain a sufficient lens performance in the prior art, such a disadvantage is caused that it is heavy and expensive because many lenses are used. In the prior art using an aspherical plastic lens, since an aspherical amount is large, it cannot be worked easily in the manufacturing process and a sufficient accuracy may not be obtained, so that an intended performance cannot be sufficiently obtained. By these reasons, a light and inexpensive projection lens unit has been desired.

In the prior art, the projection lens unit used in the projector is designed to comply with arbitrary screen sizes, and various kinds of aberration are corrected so as to obtain the optimum optical performance at the designed paraxial magnification. Therefore, when the magnification is varied for changing the screen size, the lenses in the projection lens unit must be partially or entirely redesigned to correct the aberration.

A projection lens unit has been reported that allows projection to various screen sizes only with a mechanism for moving lens elements without re-designing the lenses. This structure, however, can be used only for the zoom ratio of about 2 or less, because the performance of the projection lens unit allowing practically use cannot be ensured when the zoom ratio is larger than 2.

Moreover, a high imaging performance and thus highly accurate aberration correction are required in the projection lens unit used for projecting a high definition image in the high definition television, computer display or others. Therefore, such a design is required that enables variable magnification without changing an optical arrangement of lens elements in order to ensure a sufficient imaging performance while complying with a plurality of screen sizes.

When the projection lens unit is formed of only the glass lenses as described above, many lenses are required, resulting in disadvantages relating to the weight, cost, mounting structure and others. In the design using the aspherical plastic lenses, the aspherical amount becomes large, making the working difficult, and the optical characteristics and the shape change in accordance with the change of ambient conditions such as a temperature and a humidity, resulting in disadvantages, for example, that the designed performance cannot be fully ensured.

SUMMARY OF THE INVENTION

The present invention has been developed to overcome the above-noted disadvantages, and has an object to provide a projection lens unit, according to which a single projection lens unit can comply with variable screen sizes including the size corresponding to a zoom ratio of about 4, and which can be practically used for projecting a high definition image in a high definition television, a computer display and others.

A projection lens unit of the invention comprises, in accordance with the order of disposition from a screen side, a first lens group including a positive meniscus lens, a second lens group including a double convex lens, and a third lens group for correcting curvature of field which has two concave lenses. A projector, which uses as an image source a CRT (Cathode Ray Tube) and is provided with the projection lens unit of the invention, employs an optical coupling method using liquid such as ethylene glycol for cooling the CRT and reducing reflected light between the CRT and the projection lens unit. The curvature of field, which occurs when changing the magnification of the projection lens unit, can be effectively corrected by changing a liquid thickness of the optically coupling layer. However, this complicates a mechanism for changing the magnification, resulting in increase of the cost. Therefore, it is desirable to arrange an adjustment mechanism in the projection lens unit, and the projection lens unit according to the invention has such a structure that one negative lens, which is used in the prior art for correcting the curvature of field and is located nearest to the image source, is replaced with two lenses so as to highly correct the curvature of field, which is caused by the change of magnification, with the simple adjustment mechanism.

Accordingly, the curvature of field caused by the change of magnification can be accurately corrected by changing a distance between the two lens. Thereby, it is possible to provide the projection lens unit for the projector in which aberration is sufficiently corrected even if the screen size is variable correspondingly to the zoom ratio more than 4. The adjustment of the projection lens unit required correspondingly to the change of the magnification can be completely carried out only by the structure in the projection lens unit, so that the adjustment mechanism and a lens tube can have simple structures, resulting in reduction of the cost of the whole projection lens unit.

A projection lens unit according to an advantageous embodiment of the invention comprises, in accordance with the order of disposition from a screen side, a first lens of a positive meniscus form having aspherical surfaces at its opposite sides, a second lens having a negative meniscus form, third and fourth lenses for gathering light, fifth and sixth lenses each having aspherical surfaces at its opposite sides, a seventh lens of a meniscus form having a concave surface directed to a screen side, and an eighth lens having a concave surface directed to the screen side.

In this projection lens unit, the first and second lenses disposed at the screen side correct the spherical aberration, and the coma aberration and disperse light. The third and fourth lenses perform a major portion of the light gathering function in the whole system, and the change of a temperature and/or a humidity do not cause defocus of the same to a large extent because they are formed of glass lenses. The fifth lens serves to balance the spherical aberration with respect to the upstream lens, and also serves to correct astigmatism and light-gathering effect. The sixth lens highly corrects the coma aberration, astigmatism and distortion aberration through the whole image surface. The seventh lens has a negative power, and its meniscus form serves to assist correction of the distortion of the image surface for correctly forming the screen image. The eighth lens having the concave surface directed to the screen side cooperates with the seventh lens to correct the distortion of the screen image.

In order to fully obtain the aforementioned function, each of the first, fifth and sixth lenses has at least one aspherical surface. In order to reduce the weight and cost of the projection lens unit, the lenses may be made of plastics.

The projection lens unit according to a further advantageous embodiment of the invention satisfies the following conditions:

$$0.08 < p1/p0 < 0.17 \quad (1)$$

$$1.00 < p8/p7 < 6.00 \quad (2)$$

wherein, p0: power (degree, refractivity) of the whole projection lens unit p1: power of the first lens p7: power of the seventh lens p8: power of the eighth lens The above condition (1) relates to the power of the first lens. When the value is lower than the lower limit, a diameter of light flux and thus a lens diameter increase excessively, and it is difficult to ensure an intended F-number. When the value is higher than the upper limit, it is difficult to correct the spherical aberration, and a large negative power of the second lenses group is required for ensuring the F-number, so that an incidence angle of the second lens group, and particularly of peripheral light beams excessively increases, which may result in degradation of contrast.

The above condition (2) relates to a negative power distribution of the seventh and eighth lens, and strongly affects the lens performance at the time of change of magnification of the projection lens unit. It is assumed that the paraxial magnification is reduced by the movement of the lens groups from the reference value which is a paraxial magnification determined at the time of design of the lenses. In this case, when the value in the condition (2) decreases below the lower limit, the correction of the curvature of field becomes under, and the aberration balance is lost particularly at a peripheral portion, so that it becomes difficult to correct the balance by the movement of another lens group. When the value exceeds the upper limit, the correction of the curvature of field becomes over, so that the correction of aberration becomes difficult by the similar reason.

Another object of the invention is to provide a projection lens unit, which has a superior imaging performance through a whole screen, has aspherical lenses which are easily worked, and is sufficiently resistive to change of ambient conditions such as a temperature and a humidity.

A projection lens unit according to another advantageous embodiment of the invention comprises, in accordance with the order of disposition from a screen side, a first lens of a positive meniscus form, a second lens having a negative meniscus form, a third lens which is a double-convex lens having a light-gathering function, a fourth lens which is disposed near the third lens and is a double-convex lens having a positive power, a fifth lens provided at its central portion with a convex surface directed to a screen and provided at its peripheral portion with a concave portion directed to the screen, and a sixth lens having a concave surface directed to the screen. Each of the second, fourth and fifth lenses has at least one aspherical surface.

In this projection lens unit, the first and second lenses disposed at the screen side correct the spherical aberration, and the coma aberration and disperse light. The third lens performs a major portion of the light gathering function in the whole system. The fourth lens which is disposed adjacent to the third lens serves to gather the light and serves to balance the spherical aberration with respect to the upstream lens system and to correct astigmatism. The fifth lens highly corrects the coma aberration, astigmatism and distortion aberration through the whole image. The sixth lens having the concave surface at the screen side serves to correct the distortion of the image surface for correctly forming the screen image oil the image surface.

The projection lens unit according to a further advantageous embodiment of the invention satisfies the following conditions:

$$0.2 < f0/f1 < 0.35 \quad (3)$$

$$-5.8 < f2/f45 < -2.0 \quad (4)$$

wherein, f0 . . . focal length of the whole lens system f1 . . . focal length of the first lens f2 . . . focal length of the second lens f45 . . . composite focal length of the fourth and fifth lenses The above condition (3) relates to the power of the first lens. When the value is lower than the lower limit, a diameter of light flux and thus a lens diameter increase excessively, and it is difficult to ensure an intended F-number. When the value is higher than the upper limit, it is difficult to correct, in particular, the spherical aberration, and an aspherical amount of the second lens increases.

The above condition (4) relates to a power distribution of the aspherical plastic lenses. The plastic lenses change their optical characteristics and shapes in accordance with the change of the temperature and humidity, so that it is effective to dispose appropriately the positive and negative powers for canceling defocus and generated aberration in the optical system generating the heat such as a CRT type projector. In the above condition (4), when the value is lower than the lower limit, the screen image is defocused rearward with respect to the image surface. When the value is higher than the upper limit, the screen image is defocused forward with respect to the image surface (to the screen side). In either case, the intended performance cannot be fully obtained in the practical use.

In order to attain sufficiently the aforementioned operation, each of the second, fourth and fifth lenses is provided with at least one aspherical surface. Plastics may be used as the material for reducing the weight and cost of the projection lens unit.

In the projection lens unit according to yet another advantageous embodiment of the invention, a difference in thickness between the central portion and the peripheral portion of the fourth lens is smaller than that of the third lens, and the fourth lens has a positive meniscus form including a concave surface directed to the screen.

The above and further objects and features of the invention will more fully be apparent from the following detailed description with accompanying drawings.

DESCRIPTION OF THE PREFERRED EMBODIMENTS

Embodiments of the invention will be specifically described below with reference to the drawings.

Embodiment 1

Figure 1:
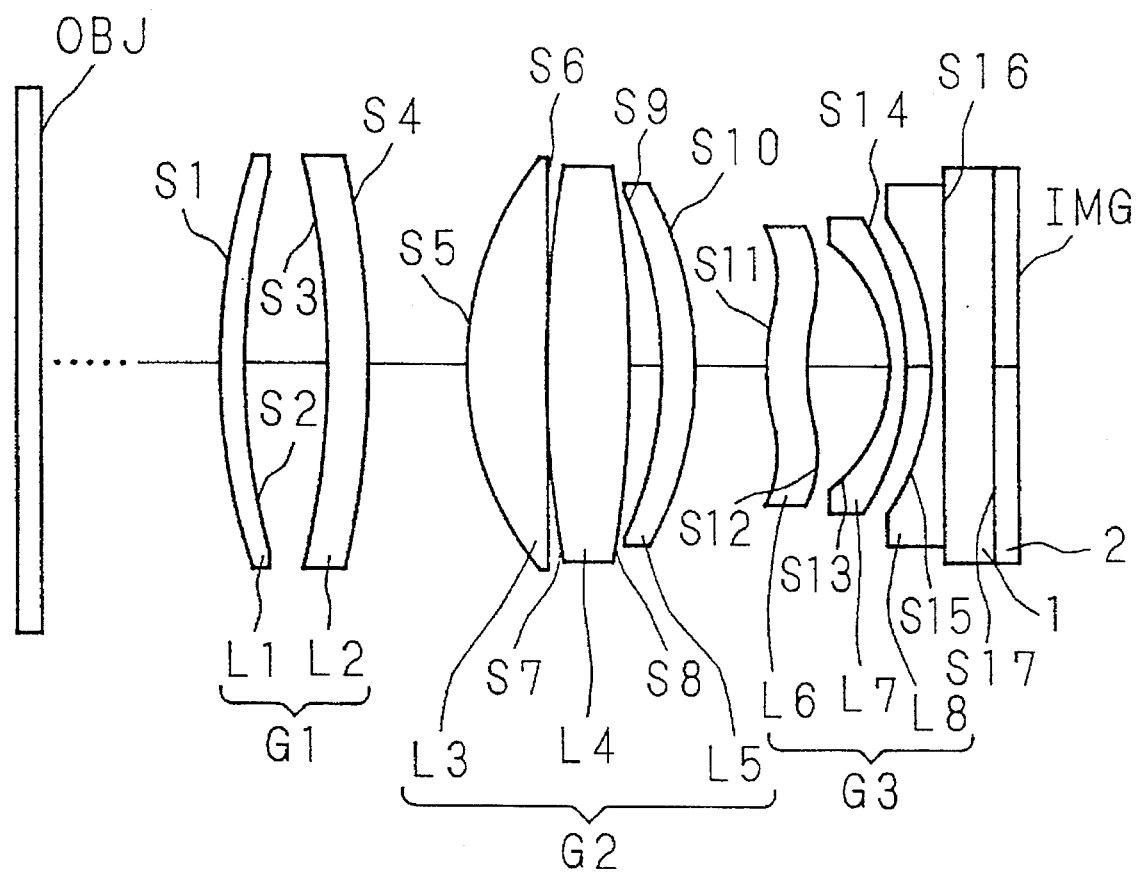
FIG. 1 shows a structure of a first embodiment of a projection lens unit according to the invention.

FIG. 1 shows a structure of a projection lens unit according to the invention. The projection lens unit according to the invention comprises, in accordance with the order of disposition from a side of a screen OBJ to a side of a fluorescent screen IMG of a CRT as shown in FIG. 1, a first lens group G1 having a weak dispersing function for correcting spherical and coma aberration, a second lens group G2 having a light-gathering function, and a third lens group G3 for correcting higher-order aberration and distortion of an image face.

The first lens group G1 includes a first lens L1 having a positive meniscus lens form and a second lens L2 having a negative meniscus lens form. The second lens group G2 includes a third lens L3 having a strong light-gathering function, a fourth lens L4 which is a double-convex lens and a fifth lens having aspherical surfaces at opposite sides. The third lens group G3 includes a sixth lens L6 of which surface directed to the screen is convex at a center of the lens and is concave at a periphery thereof, a seventh lens L7 which is a concave lens, and an eighth lens L8 having a strongly concave surface at the screen side.

A distance between the two negative lens provided in the third lens group can be changed mutually so as to correct mainly the distortion of an image surface when the magnification is changed.

In the figures, Si indicates a number of a surface at an ith position from the screen OBJ side. IMG indicates a CRT fluorescent screen, i.e., an image surface. A space between the last surface (S16) of the projection lens unit and the CRT surface (S17) is filled with liquid 1 for optical coupling, and the space between the CRT surface and the IMG is defined by a portion of a glass container (face plate 2) for maintaining vacuum. The structures described above are employed also in all the embodiments 1–6.

Table 1 shows radii of curvature R of lens surfaces S1–S17, surface distances I, indexes of refraction nd at d-line (587.56 nm) and main dispersion vd. Table 2 shows conic coefficients K and aspherical coefficients A, B, C and D at surfaces S1, S2, S9, S10, S11 and S12.

TABLE 1

|  | R | I | n d | v d |
|---|---|---|---|---|
| O B J | I N F | 2845.380 | | |
| S 1 | 145.988 | 7.310 | 1.4920 | 55.4 |
| S 2 | 201.352 | 23.828 | | |
| S 3 | −417.760 | 10.000 | 1.5168 | 64.2 |
| S 4 | −1018.771 | 30.322 | | |
| S 5 | 101.112 | 27.000 | 1.5891 | 61.3 |

TABLE 1-continued

|     | R          | I      | n d    | v d  |
|-----|------------|--------|--------|------|
| S 6 | -31010.981 | 0.500  |        |      |
| S 7 | 627.908    | 19.635 | 1.5168 | 64.2 |
| S 8 | -574.696   | 16.554 |        |      |
| S 9 | -330.073   | 10.500 | 1.4920 | 55.4 |
| S 10 | -232.077  | 30.929 |        |      |
| S 11 | 207.706   | 10.418 | 1.4920 | 55.4 |
| S 12 | 468.797   | 20.124 |        |      |
| S 13 | -65.227   | 4.000  | 1.5168 | 64.2 |
| S 14 | -95.000   | 7.000  |        |      |
| S 15 | -95.000   | 3.500  | 1.6200 | 36.3 |
| S 16 | INF       | 15.000 | 1.3997 |      |
| S 17 | INF       | 7.000  | 1.5374 |      |
| IMG  | INF       |        |        |      |

TABLE 2

|     | K         | A            | B            | C            | D            |
|-----|-----------|--------------|--------------|--------------|--------------|
| S1  | -0.349258 | -0.732615E-7 | 0.160089E-10 | -0.124397E-14 | -0.447168E-19 |
| S2  | -1.355255 | 0.279429E-7  | 0.267560E-10 | -0.169829E-14 | 0.986783E-19  |
| S9  | 24.254848 | -0.844382E-6 | 0.404277E-10 | -0.362330E-14 | 0.307655E-17  |
| S10 | 10.616728 | -0.945487E-6 | 0.139651E-9  | -0.149841E-13 | 0.298915E-17  |
| S11 | -10.469533 | -0.145079E-5 | -0.315598E-9 | 0.661905E-13 | -0.238885E-16 |
| S12 | 2.861217  | -0.120053E-5 | -0.392958E-9 | 0.861659E-13  | -0.168525E-16 |

The configuration of an aspherical surface can be defined by the following formula, wherein a surface apex is used as the reference, X represents a distance along an optical axis, Q represents a distance in a direction perpendicular to the optical axis, K represents a conic coefficient, A represents a fourth-order aspherical coefficient, B represents sixth-order aspherical coefficient, C represents eighth-order aspherical coefficient, and D represents a tent-order aspherical coefficient.

$$X = \frac{Q^2/R}{1 + \{1 - (1+K)Q^2/R^2\}^{1/2}} + AQ^4 + BQ^6 + CQ^8 + DQ^{10}$$

Figure 2:
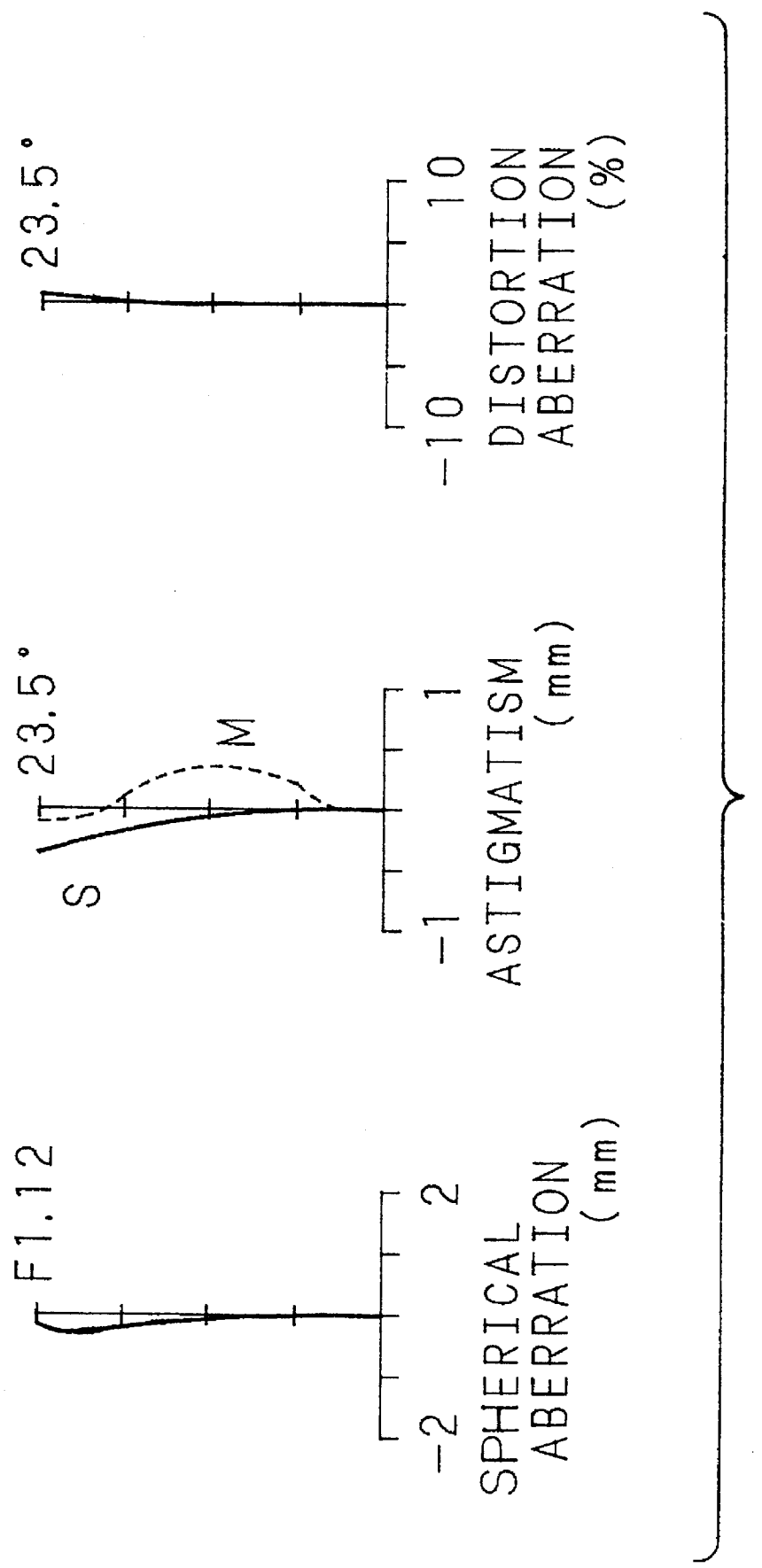
FIG. 2 shows aberration of the projection lens unit shown in FIG. 1.

Based on the above structures, it is determined in this embodiment that a ratio of the power of the first lens p1 (degree, refractivity) with respect to the power of the entire projection lens unit p0; p1/p0 is 0.135, and a ratio of the power of the eighth lens p8 with respect to the power of the seventh lens p7; p8/p7 is 1.971. FIG. 2 shows aberration of the projection lens unit having the structure described above. In the figures, F represents the F-number, and the angles at astigmatism and distortion aberration represent maximum half angles of view.

An adjustment mechanism of the projection lens unit of the invention related to the change of magnification is adapted to simultaneously move the lens in the projection lens unit, e.g., first to seventh lens shown in FIG. 1, in the forward or rearward direction, whereby the change of magnification, adjustment of focus and correction of curvature of field can be performed simultaneously without changing the power arrangement of the projection lens unit. In connection with this, the second lens may be interlocked and adjusted to adjust the balance of spherical aberration and focus at the peripheral portion, so that good MTF characteristics can be obtained with respect to the screen sizes from about 70°" to about 300°".

Figure 3:
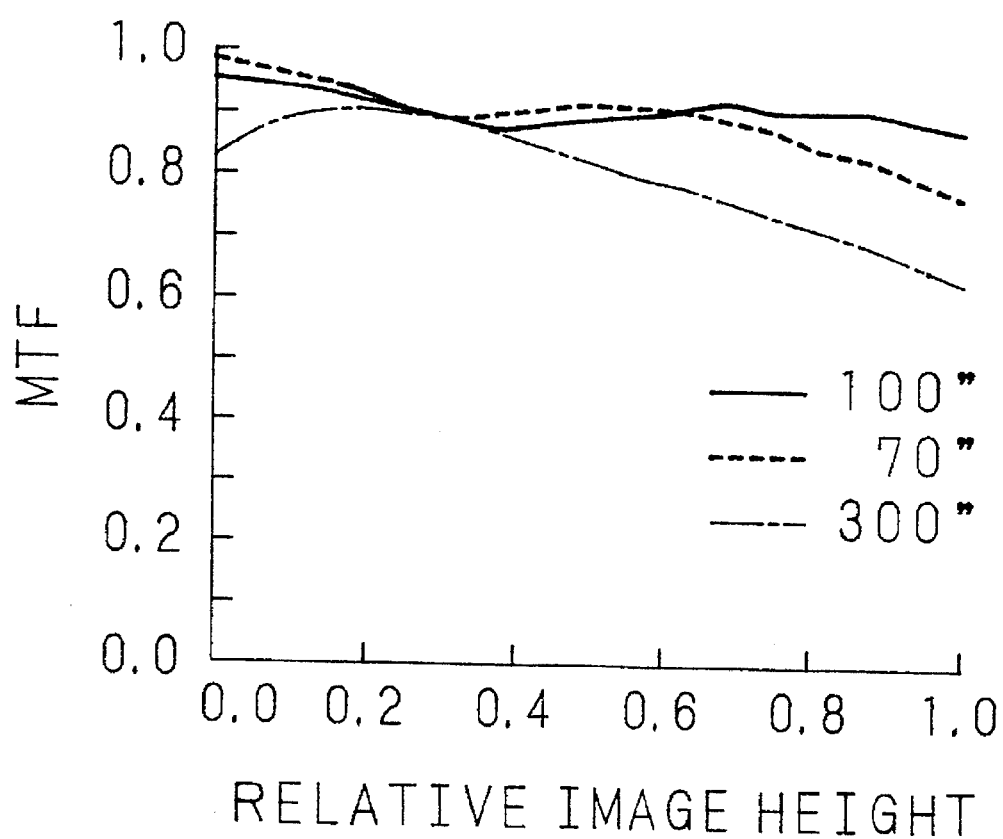
FIG. 3 shows MTF characteristics at the time changing a magnification of the projection lens unit shown in FIG. 1.

Table 3 shows moving distances of the lens element at the time changing magnifications of the projection lens unit of the invention, and FIG. 3 shows corresponding modulation transfer function (which will be referred to as "MTF" hereinafter) In FIG. 3, abscissa gives the relative image height, and the ordinate gives the MTF, which is represented as averages of S (Sagittal) and M (Meridional) calculated at the spacial frequency of 6.01 p/mm.

In the embodiments described later, the MTF characteristics relating to S and F are individually shown in the figures.

TABLE 3

| | MOVING DISTANCES OF LENS ELEMENT | | |
|---|---|---|---|
| | 100" | 70" | 300" |
| O B J | 2845.380 | 2025.481 | 8338.336 |
| S 1 | 7.310 | ← | ← |
| S 2 | 23.828 | 32.000 | 16.600 |
| S 3 | 10.000 | ← | ← |
| S 4 | 30.322 | 22.150 | 37.550 |
| S 5 | 27.000 | ← | ← |
| S 6 | 0.500 | ← | ← |
| S 7 | 19.635 | ← | ← |
| S 8 | 16.554 | ← | ← |
| S 9 | 10.500 | ← | ← |
| S 10 | 30.929 | ← | ← |
| S 11 | 10.418 | ← | ← |
| S 12 | 20.124 | ← | ← |
| S 13 | 4.000 | ← | ← |
| S 14 | 7.000 | 9.508 | 3.222 |
| S 15 | 3.500 | ← | ← |
| S 16 | 15.000 | ← | ← |
| S 17 | 7.000 | ← | ← |

Embodiment 2

Figure 4:
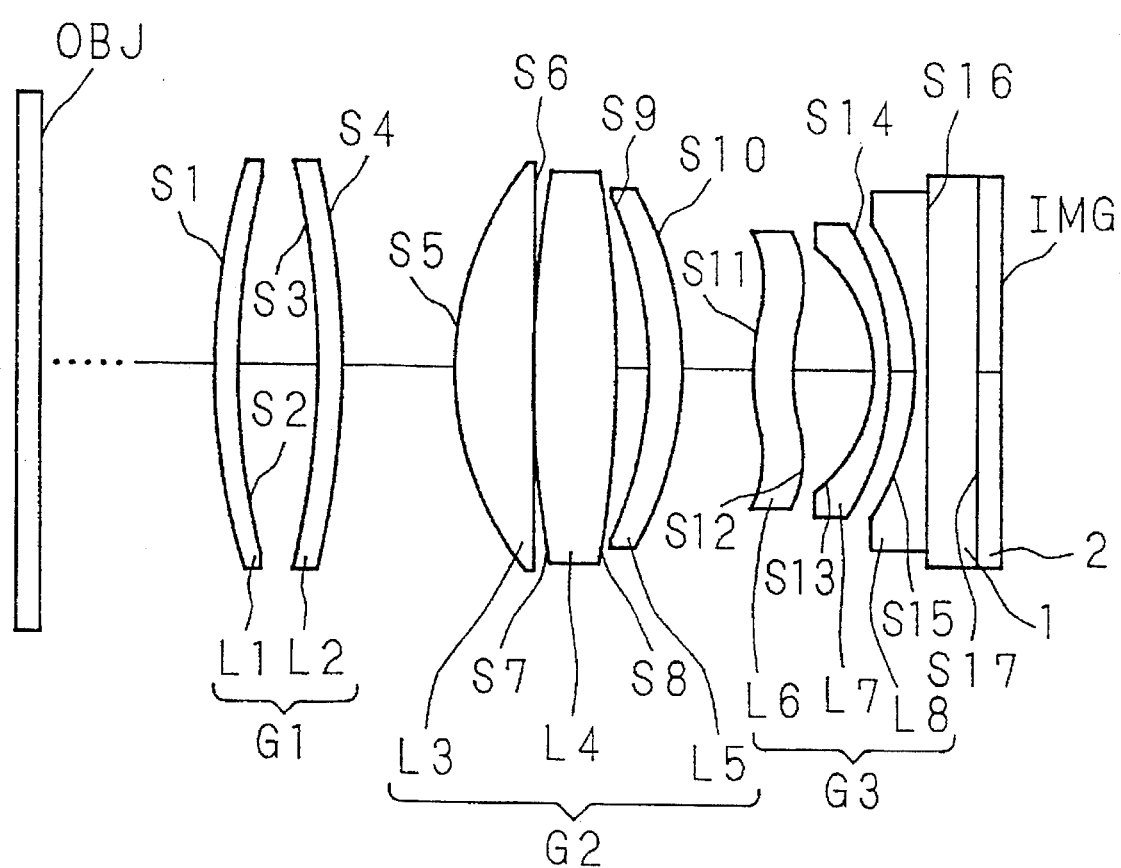
FIG. 4 shows a structure of a second embodiment of a projection lens unit according to the invention.
Figure 5:
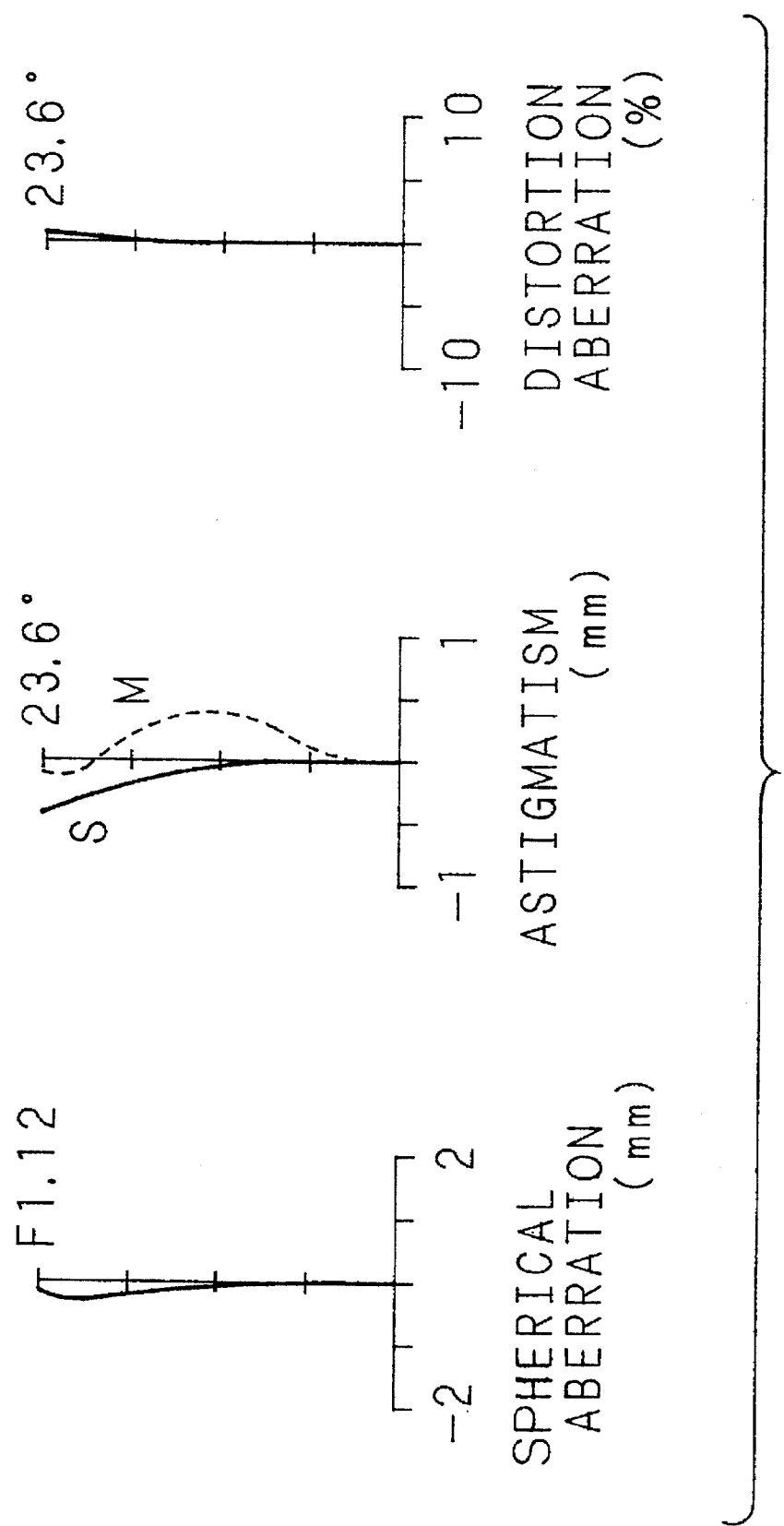
FIG. 5 shows aberration of the projection lens unit shown in FIG. 4.
Figure 6:
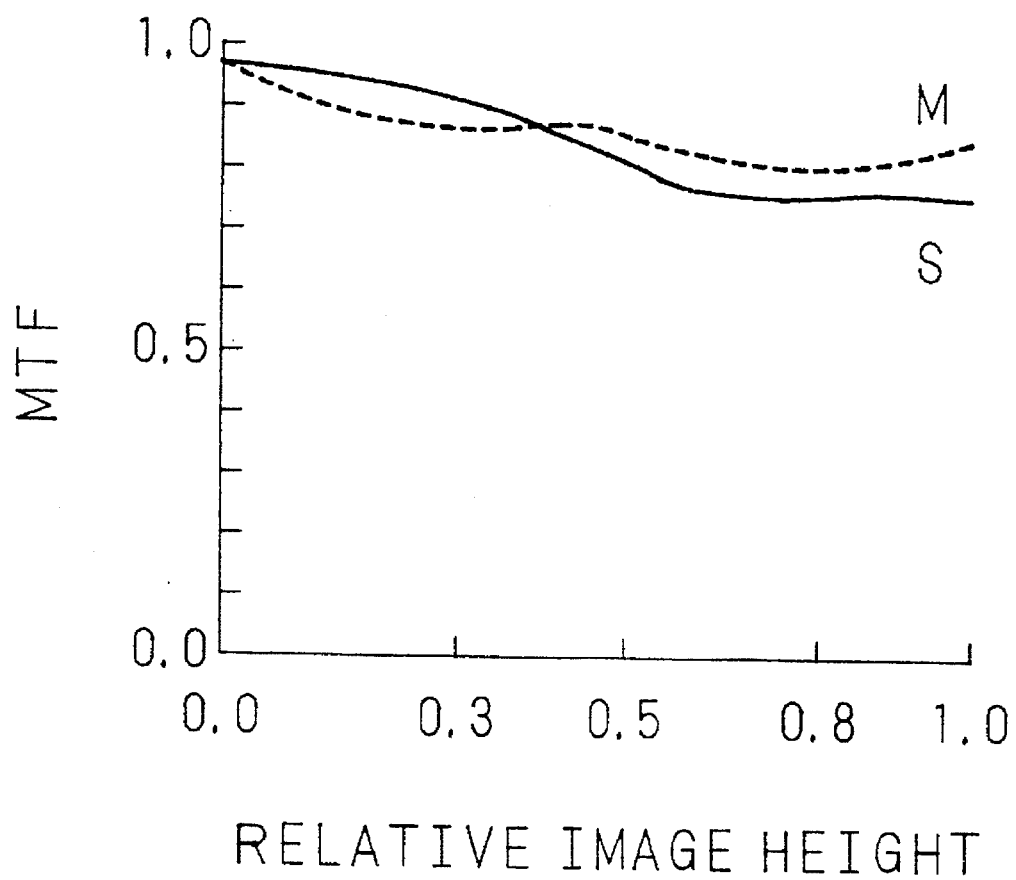
FIG. 6 shows MTF characteristics of the projection lens unit shown in FIG. 4.

FIG. 4 shows a structure of another embodiment of the projection lens unit according to the invention. FIG. 5 shows aberration of the projection lens unit shown in FIG. 4. FIG. 6 is a graph showing MTF characteristics of the projection lens unit shown in FIG. 4. Table 4 shows radii of curvature R of lens surfaces S1–S17, surface distances I, indexes of refraction nd at d-line (587.56 nm) and main dispersion vd in this embodiment. Table 5 shows conic coefficients K and aspherical coefficients A, B, C and D at surfaces S1, S2, S9, S10, S11 and S12.

TABLE 4

|  | R | I | n d | v d |
|---|---|---|---|---|
| O B J | I N F | 2849.542 |  |  |
| S 1 | 133.348 | 7.623 | 1.4920 | 55.4 |
| S 2 | 182.339 | 27.949 |  |  |
| S 3 | −345.322 | 10.000 | 1.5168 | 64.2 |
| S 4 | −655.715 | 26.093 |  |  |
| S 5 | 102.850 | 26.000 | 1.5891 | 61.3 |
| S 6 | 2025.335 | 1.375 |  |  |
| S 7 | 477.827 | 15.644 | 1.5168 | 64.2 |
| S 8 | −520.634 | 20.422 |  |  |
| S 9 | −273.105 | 8.251 | 1.4920 | 55.4 |
| S 10 | −194.406 | 30.667 |  |  |
| S 11 | 199.693 | 8.317 | 1.4920 | 55.4 |
| S 12 | 402.350 | 20.617 |  |  |
| S 13 | −64.654 | 4.000 | 1.5168 | 64.2 |
| S 14 | −95.000 | 7.000 |  |  |
| S 15 | −95.000 | 3.500 | 1.6200 | 36.3 |
| S 16 | I N F | 15.000 | 1.3997 |  |
| S 17 | I N F | 7.000 | 1.5374 |  |
| I M G | I N F |  |  |  |

TABLE 5

|  | K | A | B | C | D |
|---|---|---|---|---|---|
| S1 | −0.276728 | −0.657396E-7 | 0.181305E-10 | −0.205549E-14 | −0.191032E-19 |
| S2 | −0.747567 | 0.376382E-7 | 0.302222E-10 | −0.266849E-14 | 0.190541E-18 |
| S9 | 15.500683 | −0.961652E-6 | 0.353007E-10 | −0.204995E-14 | 0.322321E-17 |
| S10 | 6.609232 | −0.102535E-5 | 0.138731E-9 | −0.165659E-13 | 0.333257E-17 |
| S11 | −7.265274 | −0.157793E-5 | −0.339863E-9 | 0.896738E-13 | −0.342370E-16 |
| S12 | −12.370288 | −0.131854E-5 | −0.423951E-9 | 0.105263E-12 | −0.251929E-16 |

Based on the above structures, it is determined in this embodiment that a ratio of the power of the first lens p1 with respect to the power of the entire projection lens unit p0; p1/p0 is 0.099, and a ratio of the power of the eighth lens p8 with respect to the power of the seventh lens p7; p8/p7 is 2.310.

Embodiment 3

Figure 7:
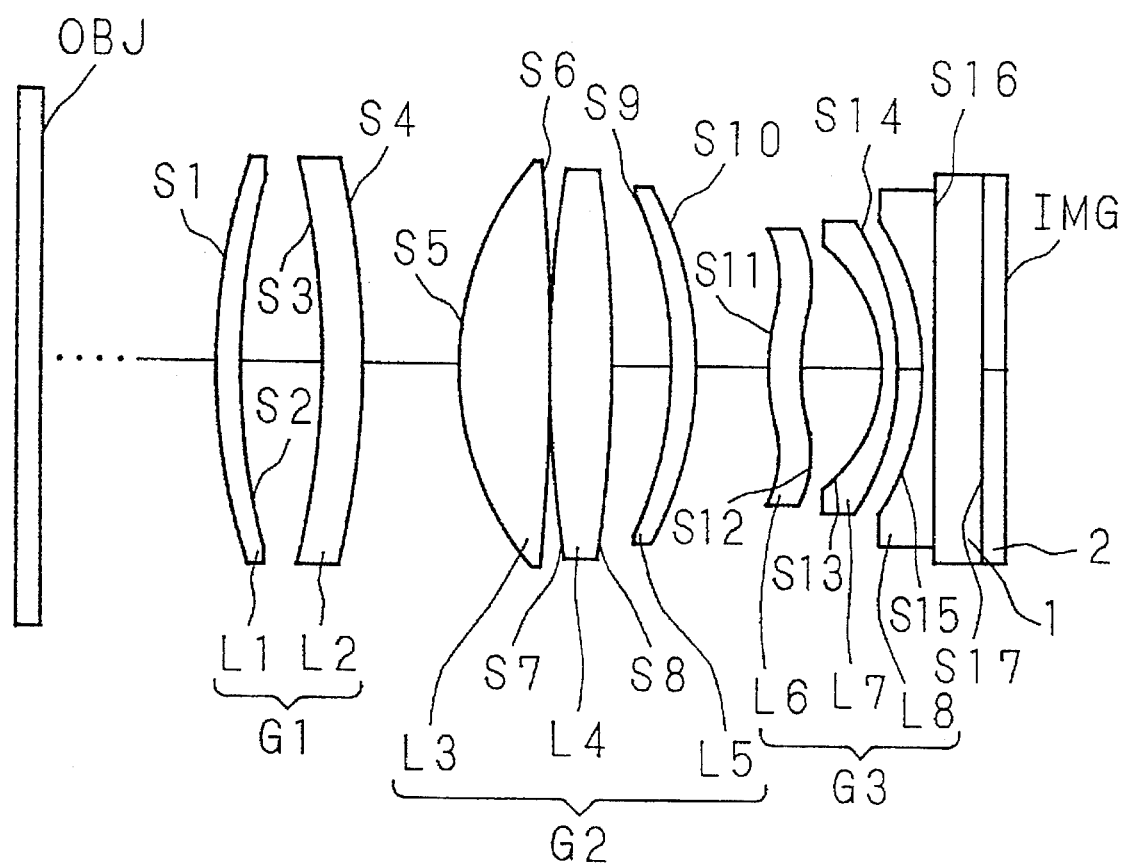
FIG. 7 shows a structure of a third embodiment of a projection lens unit according to the invention.
Figure 8:
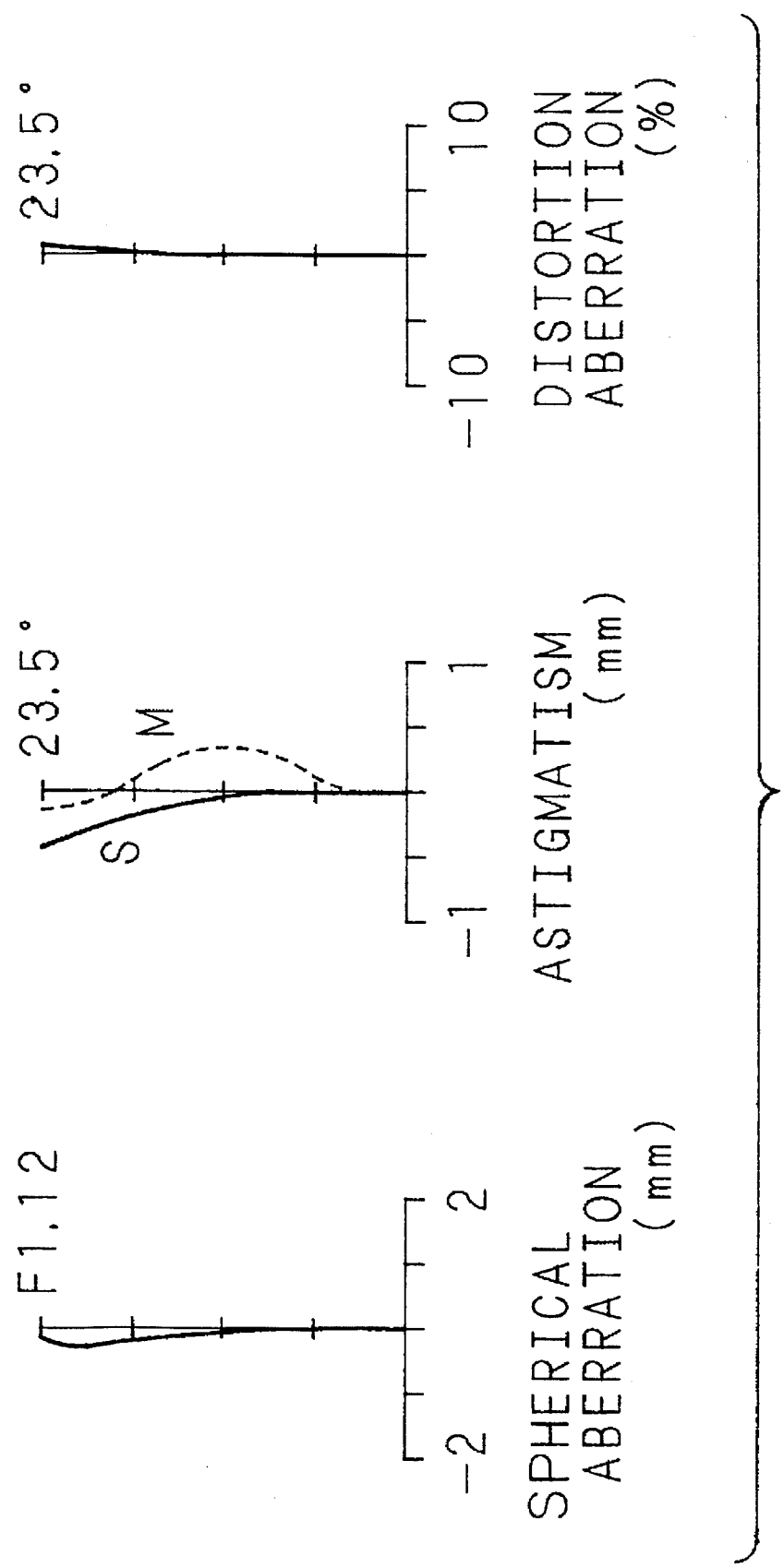
FIG. 8 shows aberration of the projection lens unit shown in FIG. 7.
Figure 9:
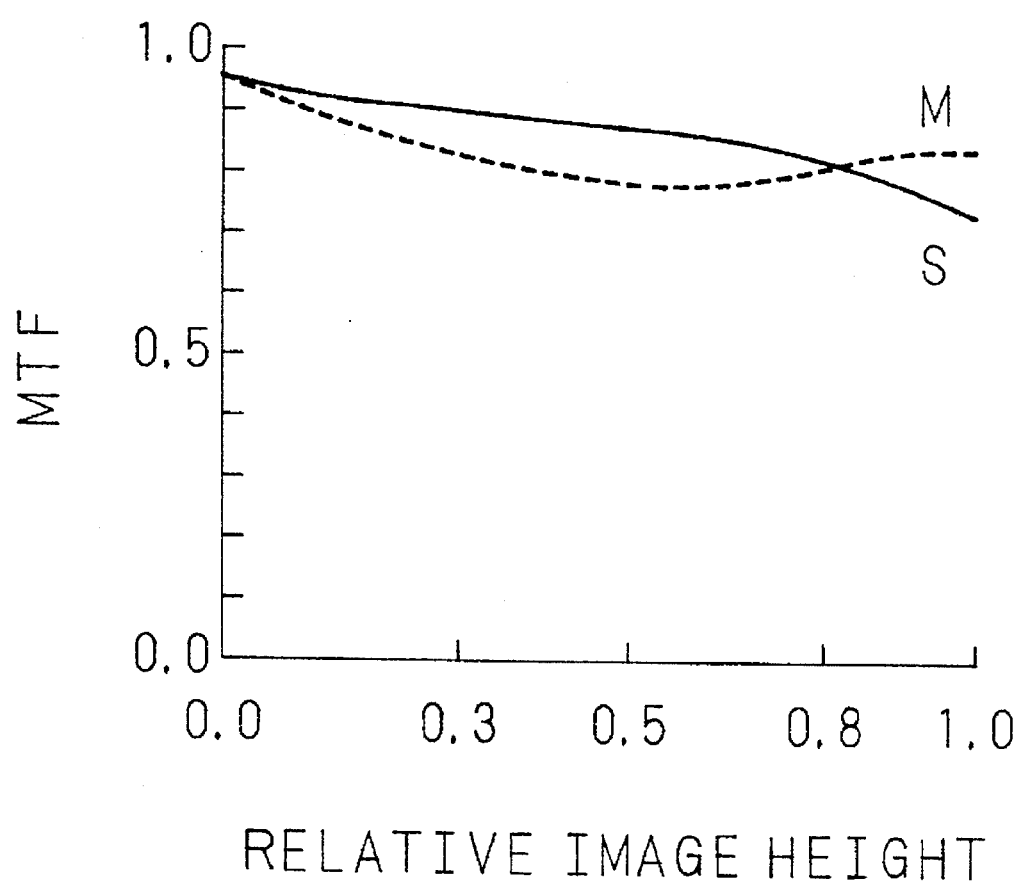
FIG. 9 shows MTF characteristics of the projection lens unit shown in FIG. 7.

FIG. 7 shows a structure of still another embodiment of the projection lens unit according to the invention. FIG. 8 shows aberration of the projection lens unit shown in FIG. 7. FIG. 9 is a graph showing MTF characteristics of the projection lens unit shown in FIG. 7, Table 6 shows radii of curvature R of lens surfaces S1–S17, surface distances I, indexes of refraction nd at d-line (587.56 nm) and main dispersion νd in this embodiment. Table 7 shows conic coefficients K and aspherical coefficients A, B, C and D at surfaces S1, S2, S9, S10, S11 and S12.

TABLE 6

|  | R | I | n d | v d |
|---|---|---|---|---|
| O B J | I N F | 2842.000 |  |  |
| S 1 | 145.505 | 8.471 | 1.4920 | 55.4 |
| S 2 | 180.555 | 28.827 |  |  |
| S 3 | −215.094 | 4.168 | 1.5168 | 64.2 |
| S 4 | −299.074 | 28.636 |  |  |
| S 5 | 108.154 | 35.356 | 1.5891 | 61.3 |
| S 6 | −1015.770 | 0.100 |  |  |
| S 7 | 455.119 | 14.388 | 1.5168 | 64.2 |
| S 8 | −3559.558 | 18.832 |  |  |
| S 9 | −327.532 | 11.771 | 1.4920 | 55.4 |
| S 10 | −231.428 | 27.247 |  |  |
| S 11 | 184.629 | 11.859 | 1.4920 | 55.4 |
| S 12 | 348.651 | 20.845 |  |  |
| S 13 | −68.268 | 4.000 | 1.5168 | 64.2 |
| S 14 | −95.000 | 7.000 |  |  |
| S 15 | −95.000 | 3.500 | 1.6200 | 36.3 |
| S 16 | I N F | 15.000 | 1.3997 |  |
| S 17 | I N F | 7.000 | 1.5374 |  |
| I M G | I N F |  |  |  |

TABLE 7

|  | K | A | B | C | D |
|---|---|---|---|---|---|
| S1 | −0.213016 | −0.641063E-7 | 0.153266E-10 | −0.160825E-14 | −0.543699E-19 |
| S2 | −0.836100 | 0.352582E-7 | 0.238226E-10 | −0.144051E-14 | 0.103066E-19 |
| S9 | 24.450671 | −0.819025E-6 | 0.286889E-10 | −0.315062E-14 | 0.339824E-17 |
| S10 | 10.829816 | −0.959246E-6 | 0.141235E-9 | −0.148134E-13 | 0.309364E-17 |
| S11 | −3.207069 | −0.131928E-5 | −0.273353E-9 | 0.629674E-13 | −0.277910E-16 |
| S12 | 30.000000 | −0.989156E-6 | −0.370784E-9 | 0.684706E-13 | −0.141281E-16 |

Based on the above structures, it is determined in this embodiment that a ratio of the power of the first lens p1 with respect to the power of the entire projection lens unit p0 is; p1/p0 is 0.146, and a ratio of the power of the eighth lens p8 with respect to the power of the seventh lens p7; p8/p7 is 1.915.

Embodiment 4

Figure 10:
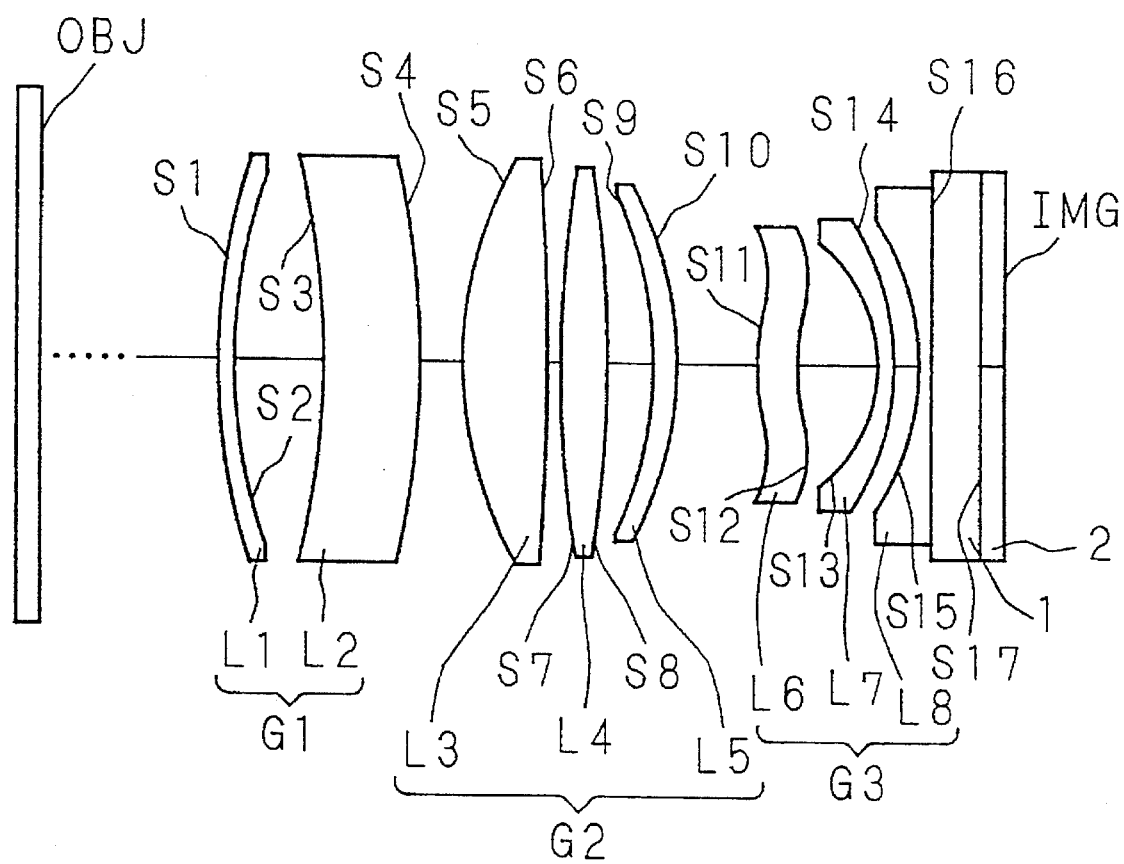
FIG. 10 shows a structure of a fourth embodiment of a projection lens unit according to the invention.
Figure 11:
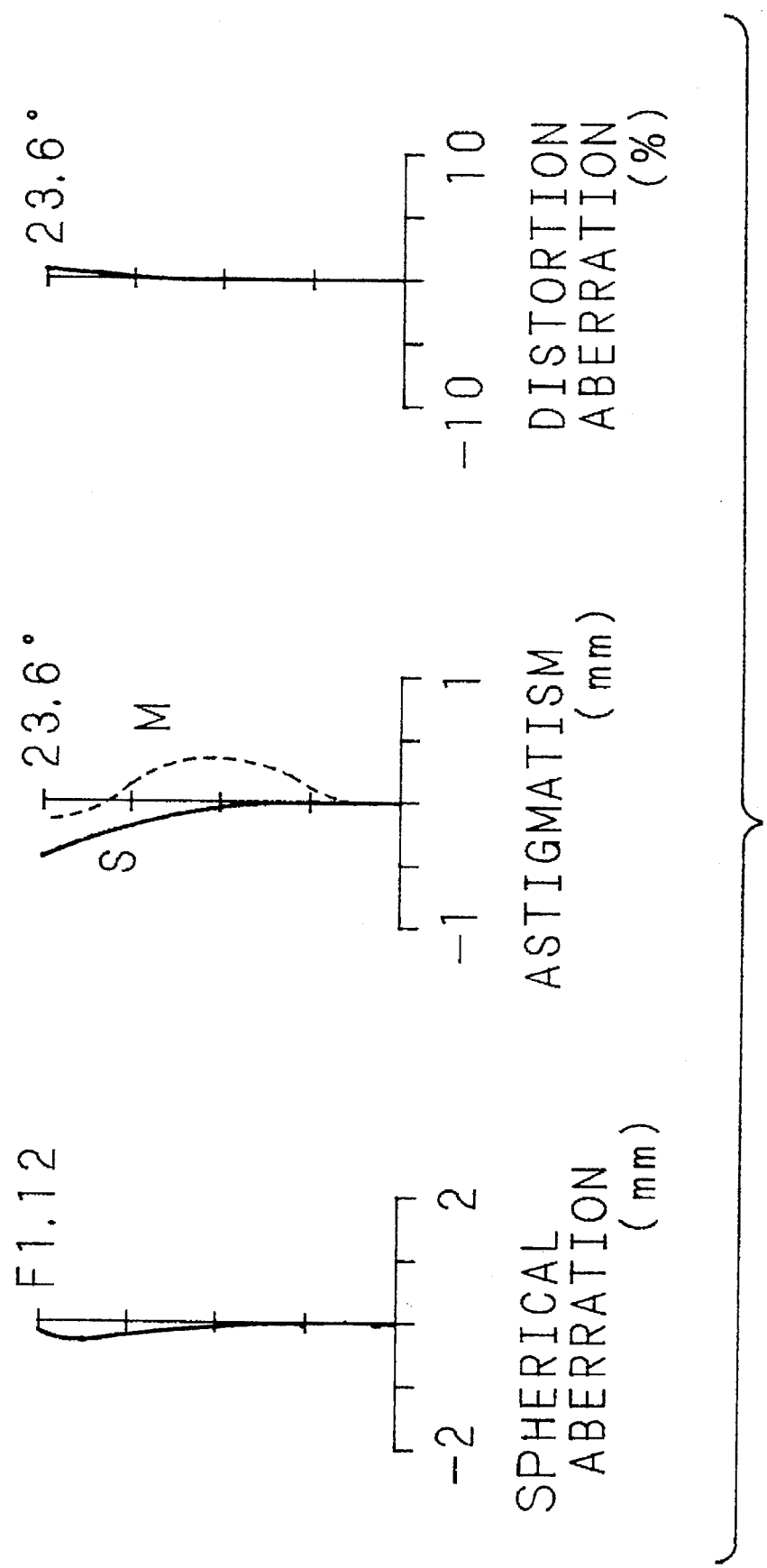
FIG. 11 shows aberration of the projection lens unit shown in FIG. 10.
Figure 12:
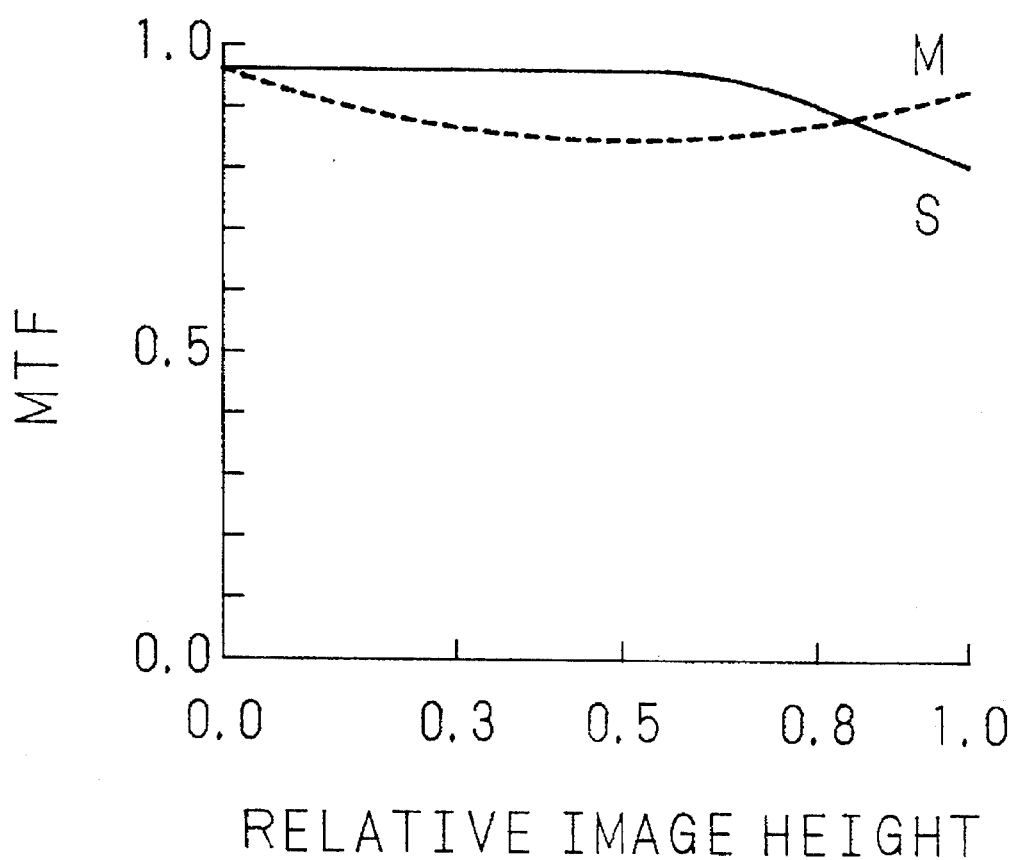
FIG. 12 shows MTF characteristics of the projection lens unit shown in FIG. 10.

FIG. 10 shows a structure of further another embodiment of the projection lens unit according to the invention. FIG. 11 shows aberration of the projection lens unit shown in FIG. 10. FIG. 12 is a graph showing MTF characteristics of the projection lens unit shown in FIG. 10. Table 8 shows radii of curvature R of lens surfaces S1–S17, surface distances I, indexes of refraction nd at d-line (587.56 nm) and main dispersion vd in this embodiment. Table 9 shows conic coefficients K and aspherical coefficients A, B, C and D at surfaces S1, S2, S9, S10, S11 and S12.

TABLE 8

|  | R | I | n d | v d |
|---|---|---|---|---|
| O B J | I N F | 2842.000 |  |  |
| S 1 | 134.257 | 5.038 | 1.4920 | 55.4 |
| S 2 | 189.665 | 25.374 |  |  |
| S 3 | −309.769 | 32.929 | 1.5168 | 64.2 |
| S 4 | −605.036 | 11.951 |  |  |
| S 5 | 105.736 | 27.000 | 1.5891 | 61.3 |
| S 6 | 1384.415 | 3.000 |  |  |
| S 7 | 406.721 | 13.506 | 1.5168 | 64.2 |
| S 8 | −514.629 | 20.000 |  |  |
| S 9 | −340.815 | 9.692 | 1.4920 | 55.4 |
| S 1 0 | −236.800 | 32.625 |  |  |
| S 1 1 | 203.886 | 9.596 | 1.4920 | 55.4 |
| S 1 2 | 550.437 | 18.729 |  |  |
| S 1 3 | −68.540 | 4.000 | 1.5168 | 64.2 |
| S 1 4 | −107.278 | 8.061 |  |  |
| S 1 5 | −95.000 | 3.500 | 1.6200 | 36.3 |
| S 1 6 | I N F | 15.000 | 1.3997 |  |
| S 1 7 | I N F | 7.000 | 1.5374 |  |
| I M G | I N F |  |  |  | main dispersion vd in this embodiment. Table 11 shows conic coefficients K and aspherical coefficients A, B, C and D at surfaces S1, S2, S9, S10, S11 and S12.

TABLE 10

|  | R | I | n d | v d |
|---|---|---|---|---|
| O B J | I N F | 2823.058 |  |  |
| S 1 | 145.016 | 12.000 | 1.4920 | 55.4 |
| S 2 | 186.897 | 29.654 |  |  |
| S 3 | −243.808 | 4.000 | 1.5891 | 61.3 |
| S 4 | −3107.955 | 12.961 |  |  |
| S 5 | 188.769 | 23.565 | 1.5891 | 61.3 |
| S 6 | −277.965 | 16.409 |  |  |
| S 7 | 221.410 | 25.000 | 1.5891 | 61.3 |
| S 8 | −969.535 | 6.514 |  |  |
| S 9 | 406.147 | 10.500 | 1.4920 | 55.4 |
| S 1 0 | 2875.103 | 41.808 |  |  |
| S 1 1 | 117.438 | 6.300 | 1.4920 | 55.4 |
| S 1 2 | 176.038 | 23.779 |  |  |
| S 1 3 | −70.460 | 4.000 | 1.5168 | 64.2 |
| S 1 4 | −83.368 | 8.047 |  |  |
| S 1 5 | −80.000 | 3.500 | 1.6200 | 36.3 |
| S 1 6 | I N F | 15.000 | 1.3997 |  |
| S 1 7 | I N F | 7.000 | 1.5374 |  |
| I M G | I N F |  |  |  |

TABLE 9

|  | K | A | B | C | D |
|---|---|---|---|---|---|
| S1 | −0.367214 | −0.770900E-7 | 0.183423E-10 | −0.132171E-14 | −0.920482E-19 |
| S2 | −1.518109 | 0.289377E-7 | 0.296698E-10 | −0.203322E-14 | 0.121392E-18 |
| S9 | 25.199806 | −0.885045E-6 | 0.467624E-10 | −0.470518E-14 | 0.278671E-17 |
| S10 | 10.616916 | −0.967695E-6 | 0.133904E-9 | −0.148055E-13 | 0.258483E-17 |
| S11 | −10.248675 | −0.135128E-5 | −0.340559E-9 | 0.811296E-13 | −0.285785E-16 |
| S12 | −0.178902 | −0.117999E-5 | −0.404064E-9 | 0.937348E-13 | −0.199720E-16 |

Based on the above structures, it is determined in this embodiment that a ratio of the power of the first lens p1 with respect to the power of the entire projection lens unit p0; p1/p0 is 0.154, and a ratio of the power of the eighth lens p8 with respect to the power of the seventh lens p7; p8/p7 is 1.778.

TABLE 11

|  | K | A | B | C | D |
|---|---|---|---|---|---|
| S1 | 2.194873 | 0.649213E-7 | 0.375849E-11 | 0.549921E-14 | −0.216561E-17 |
| S2 | 1.952699 | 0.314388E-6 | 0.248822E-10 | 0.103537E-13 | −0.256833E-17 |
| S9 | −50.000000 | −0.839426E-7 | 0.230100E-10 | −0.170235E-14 | −0.588434E-18 |
| S10 | −50.000000 | −0.409842E-6 | 0.648786E-10 | −0.757815E-14 | 0.324143E-19 |
| S11 | −4.128585 | −0.725796E-6 | −0.185206E-9 | −0.155772E-12 | 0.460418E-16 |
| S12 | −28.367727 | −0.881716E-7 | −0.503473E-9 | −0.410296E-13 | 0.274453E-16 |

Embodiment 5

Figure 13:
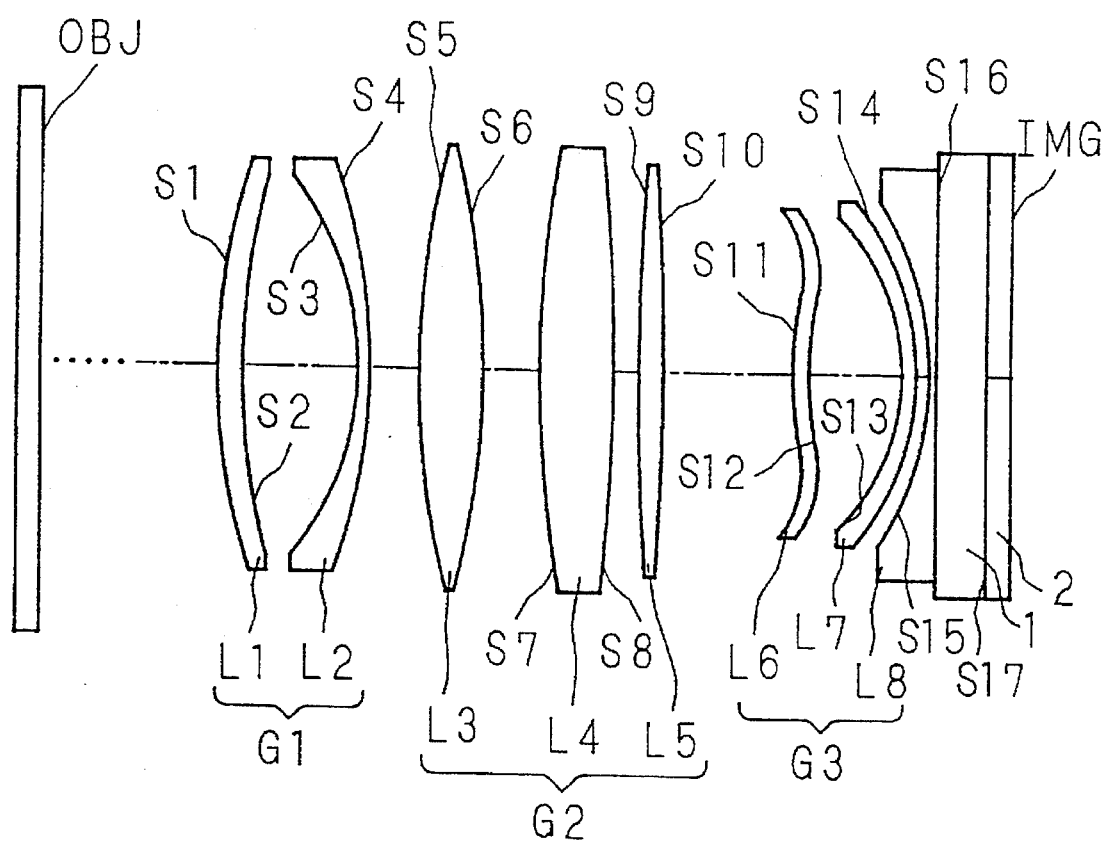
FIG. 13 shows a structure of a fifth embodiment of a projection lens unit according to the invention.
Figure 14:
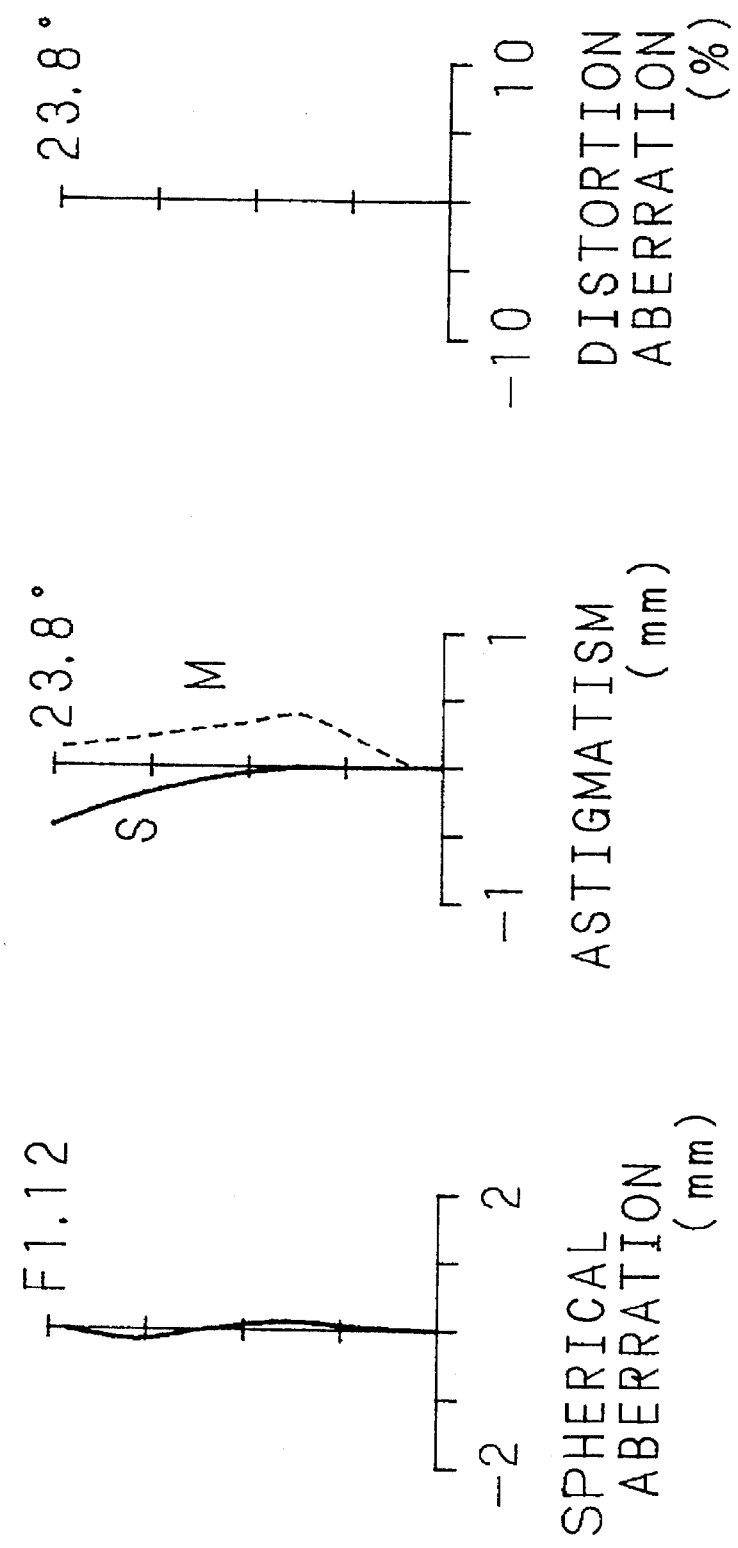
FIG. 14 shows aberration of the projection lens unit shown in FIG. 13.
Figure 15:
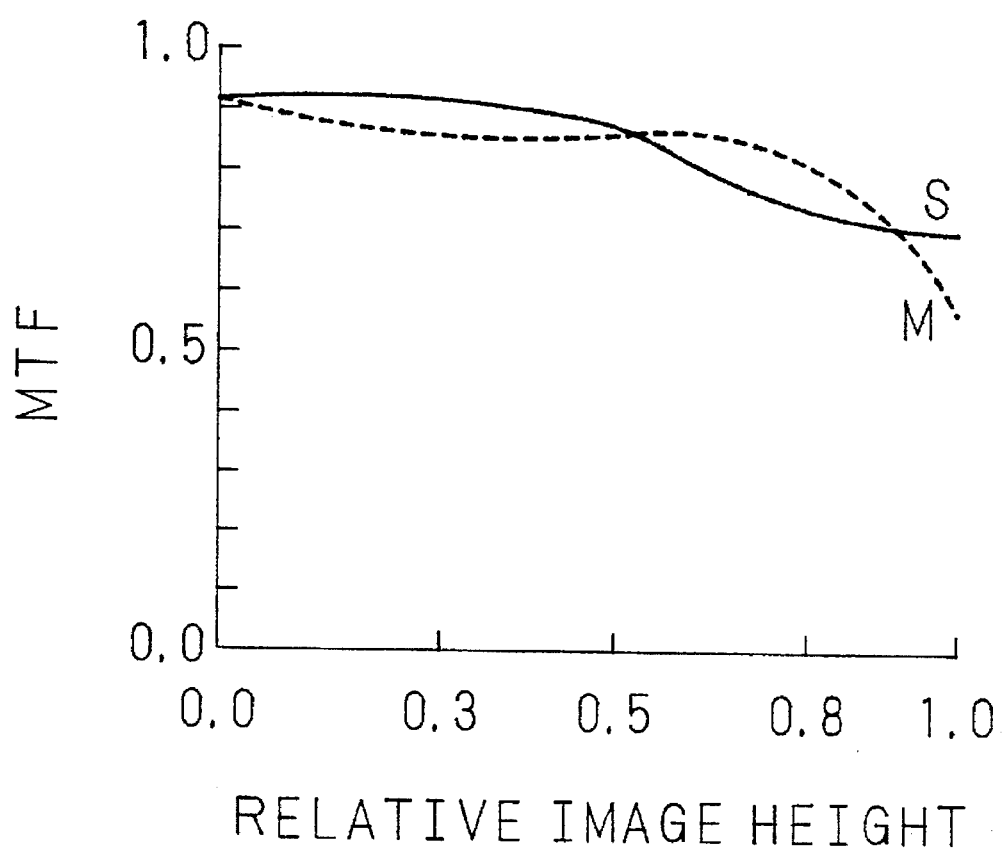
FIG. 15 shows MTF characteristics of the projection lens unit shown in FIG. 13.

FIG. 13 shows a structure of further another embodiment of the projection lens unit according to the invention. FIG. 14 shows aberration of the projection lens unit shown in FIG. 13. FIG. 15 is a graph showing MTF characteristics of the projection lens unit shown in FIG. 13. Table 10 shows radii of curvature R of lens surfaces S1–S17, surface distances I, indexes of refraction nd at d-line (587.56 nm) and Based on the above structures, it is determined in this embodiment that a ratio of the power of time first lens p1 with respect to the power of the entire projection lens unit p0; p1/p0 is 0.117, and a ratio of the power of the eighth lens p8 with respect to the power of the seventh lens p7; p8/p7 is 5.461.

Embodiment 6

Figure 16:
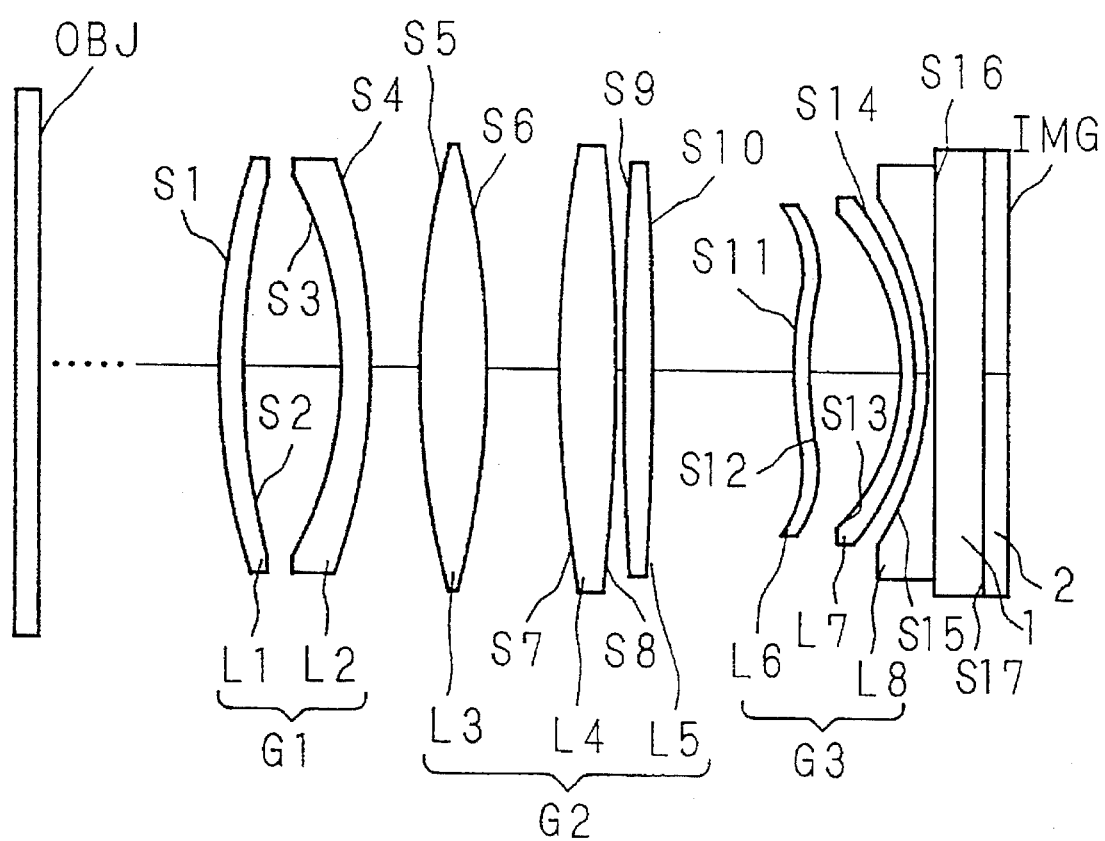
FIG. 16 shows a structure of a sixth embodiment of a projection lens unit according to the invention.
Figure 17:
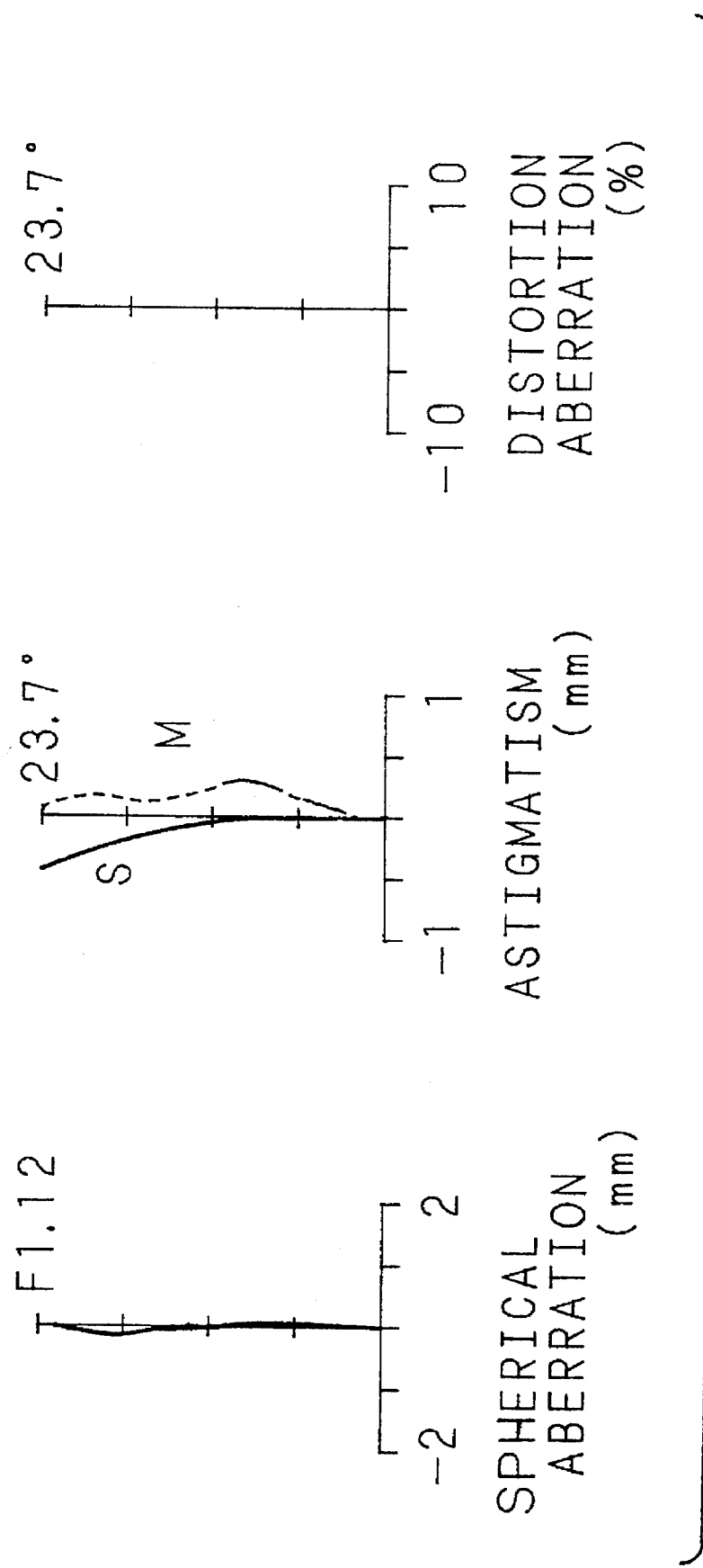
FIG. 17 shows aberration of the projection lens unit shown in FIG. 16.
Figure 18:
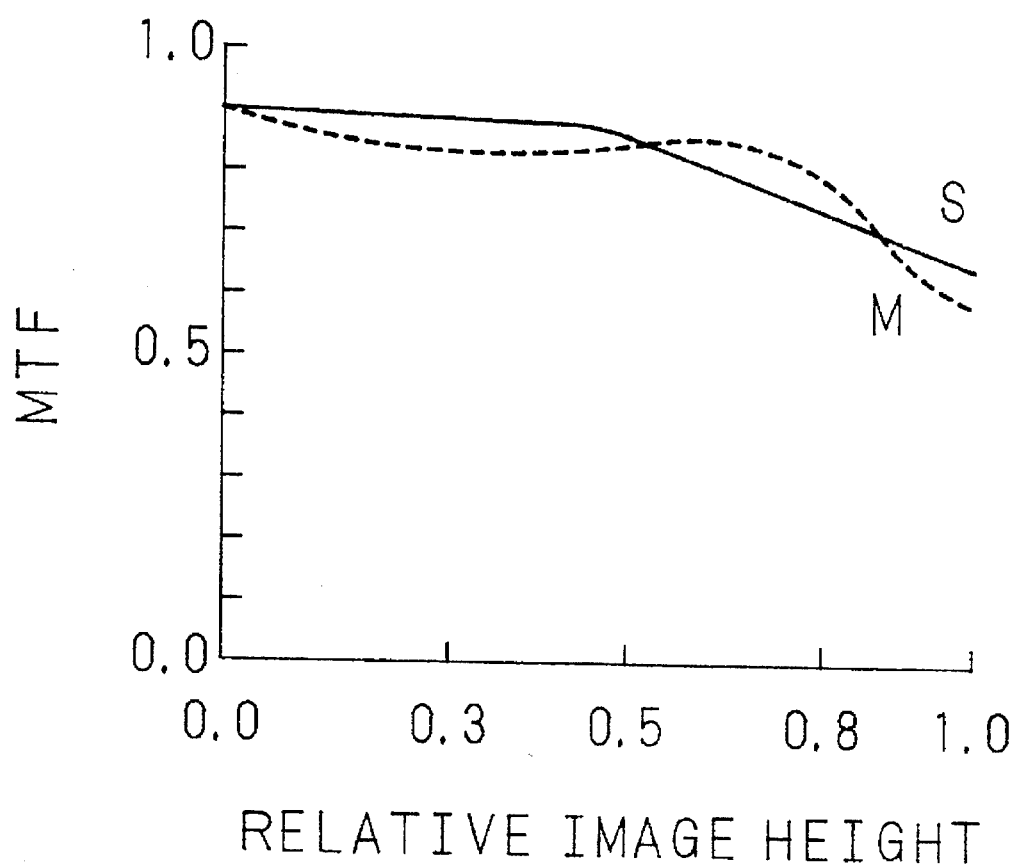
FIG. 18 shows MTF characteristics of the projection lens unit shown in FIG. 16.

FIG. 16 shows a structure of further another embodiment of the projection lens unit according to the invention. FIG. 17 shows aberration of the projection lens unit shown in FIG. 16. FIG. 18 is a graph showing MTF characteristics of the projection lens unit shown in FIG. 16. Table 12 shows radii of curvature R of lens surfaces S1–S17, surface distances I, indexes of refraction nd at d-line (587.56 nm) and main dispersion νd in this embodiment. Table 13 shows conic coefficients K and aspherical coefficients A, B, C and D at surfaces S1, S2, S9, S10, S11 and S12.

TABLE 12

|  | R | I | n d | ν d |
|---|---|---|---|---|
| O B J | I N F | 2833.533 |  |  |
| S 1 | 142.016 | 12.000 | 1.4920 | 55.4 |
| S 2 | 185.293 | 27.448 |  |  |
| S 3 | −266.803 | 7.788 | 1.5891 | 61.3 |
| S 4 | −6147.631 | 10.803 |  |  |
| S 5 | 184.970 | 22.449 | 1.5891 | 61.3 |
| S 6 | −329.083 | 22.054 |  |  |
| S 7 | 216.933 | 17.285 | 1.5891 | 61.3 |
| S 8 | −1145.554 | 1.370 |  |  |
| S 9 | 358.575 | 10.500 | 1.4920 | 55.4 |
| S 1 0 | 3978.622 | 46.156 |  |  |
| S 1 1 | 135.880 | 6.300 | 1.4920 | 55.4 |
| S 1 2 | 217.847 | 23.244 |  |  |
| S 1 3 | −72.602 | 4.000 | 1.5168 | 64.2 |
| S 1 4 | −87.095 | 10.000 |  |  |
| S 1 5 | −80.000 | 3.500 | 1.6200 | 36.3 |
| S 1 6 | I N F | 15.000 | 1.3997 |  |
| S 1 7 | I N F | 7.000 | 1.5374 |  |
| I M G | I N F |  |  |  |

TABLE 13

|  | K | A | B | C | D |
|---|---|---|---|---|---|
| S1 | 2.006105 | 0.144901E-7 | 0.395718E-11 | 0.315827E-14 | −0.170632E-17 |
| S2 | 2.413907 | 0.239421E-6 | 0.270453E-10 | 0.546727E-14 | −0.173278E-17 |
| S9 | −50.000000 | −0.583927E-8 | 0.358727E-11 | 0.492108E-15 | −0.481558E-18 |
| S10 | −50.000000 | −0.325849E-6 | 0.415693E-10 | −0.418493E-14 | −0.287506E-19 |
| S11 | −2.406621 | −0.801201E-6 | −0.168711E-9 | −0.117728E-12 | 0.359390E-16 |
| S12 | −1.525986 | −0.611013E-6 | −0.291364E-9 | −0.588215E-13 | 0.245681E-16 |

Based on the above structures, it is determined in this embodiment that a ratio of the power of the first lens p1 with respect to the power of the entire projection lens unit p0; p1/p0 is 0.124, and a ratio of the power of the eighth lens p8 with respect to the power of the seventh lens p7; p8/p7 is 5.169.

The projection lens units of the embodiments 1–6 includes the third lens group provided with the two negative lens, so that it can achieve good MTF characteristics at various screen sizes including the size corresponding to the zoom ratio more than 4 without changing the power arrangement to a large extent at the time of change of the magnification, in spite of the fact that the single projection lens unit and the simple adjustment mechanism are used.

Since the adjustment mechanism required in connection with the change of the magnification is formed of the simple structure entirely provided in the projection lens unit, structures of the lens tube and the mounting mechanism can be simple, resulting in reduction of the cost of the entire projection lens unit and the projector set.

The magnifiable projection lens unit can employ the hybrid structure including the plastic lens having an aspherical surface for obtaining the lens performance allowing projection of a high definition image, whereby the weight and cost of the protection lens unit can be reduced. Further, such a structure may be employed that the plastic lens having the aspherical surface serves mainly to correct the aberration and is designed to have a reduced number of inflection points, whereby the tolerance allowed in the formation and working can be large, and the designed performance can be sufficiently obtained.

Embodiment 7

Figure 19:
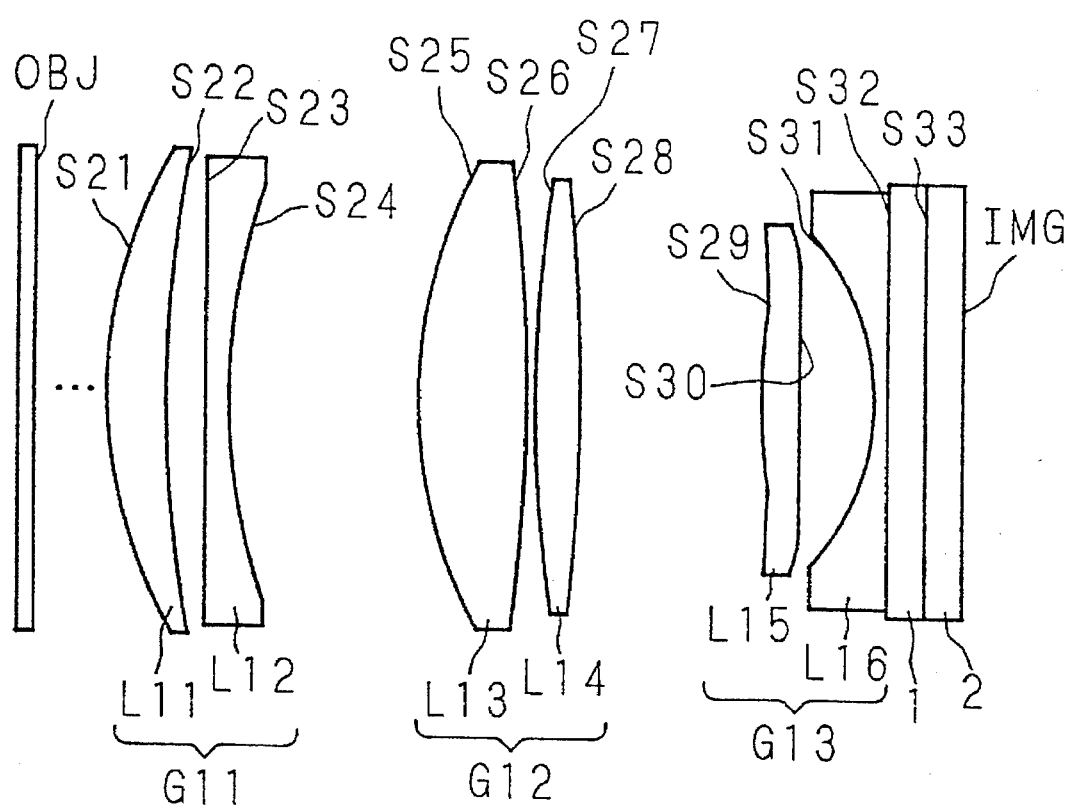
FIG. 19 shows a structure of a seventh embodiment of a projection lens unit according to the invention.

FIG. 19 shows a structure of further another embodiment of the projection lens unit according to the invention. The projection lens unit in this embodiment and subsequent embodiments which will be described later comprises, in accordance with the order from the surface OBJ side to the fluorescent surfaces IMG side of the CRT, a first lens group G11 having a weak dispersing function and provided for correcting the spherical aberration and coma aberration, a second lens group G12 having a light-gathering function, and a third lens group G13 provided for correcting the higher-order aberration and distortion of the image surface.

The first lens group G11 includes a first lens L11 of a positive meniscus form and a second lens L12 of a negative meniscus form. The second lens group G12 includes a double convex third lens L13 having a strong light-gathering function and a double convex Fourth lens L14 which is disposed near the third lens L13 and has a weak positive power. The third lens group G13 includes a firth lens L15 having a central portion convexed toward the screen OBJ side and a peripheral portion concaved toward the screen OBJ side, and a sixth lens L16 having a strongly concaved surface directed to the screen OBJ side.

Each of the second, fourth and fifth lens L12, L14 and L15 has at least one aspherical surface, and is made of plastics for reducing the weight and cost of the projection lens unit. In order to achieve the designed performance regardless of the change of the ambient conditions, i.e., temperature and humidity, the positive and negative powers of the plastic lens are appropriately arranged for canceling the changes of the optical characteristics. The aforementioned structures are common to all the embodiments 7–11.

Table 14 shows radii of curvature R of lens surfaces S21–S33 shown in FIG. 19, surface distances I, indexes of refraction nd at d-line (587.56 nm) and main dispersion νd. Table 15 shows conic coefficients K and aspherical coefficients A, B, C and D at surfaces S23, S24, S27, S28, S29 and S30. The relationship between the conic coefficients K and the aspherical coefficients A, B, C and D, and an optical axis X is the same as that already described.

TABLE 14

|  | R | I | n d | ν d |
|---|---|---|---|---|
| O B J | I N F | 2989.00 |  |  |
| S 2 1 | 150.014 | 15.390 | 1.5891 | 61.3 |
| S 2 2 | 293.830 | 10.000 |  |  |
| S 2 3 | 1053.622 | 7.500 | 1.4920 | 55.4 |

TABLE 14-continued

| | R | I | n d | v d |
|---|---|---|---|---|
| S 2 4 | 245.079 | 61.148 | | |
| S 2 5 | 142.628 | 30.000 | 1.5891 | 61.3 |
| S 2 6 | −467.168 | 2.188 | | |
| S 2 7 | 229.095 | 14.000 | 1.4920 | 55.4 |
| S 2 8 | −99332.211 | 57.974 | | |
| S 2 9 | 184.337 | 11.499 | 1.4920 | 55.4 |
| S 3 0 | 598.515 | 25.000 | | |
| S 3 1 | −67.887 | 4.300 | 1.6200 | 36.3 |
| S 3 2 | I N F | 11.000 | 1.3997 | |
| S 3 3 | I N F | 11.000 | 1.5374 | |
| I M G | I N F | | | |

TABLE 15

| | K | A | B | C | D |
|---|---|---|---|---|---|
| S23 | 30.0000 | 0.3242E-7 | −0.5140E-11 | −0.4496E-15 | 0.6297E-19 |
| S24 | 7.2295 | 0.1316E-6 | −0.3861E-11 | 0.9098E-17 | −0.2147E-19 |
| S27 | −2.7705 | −0.1888E-7 | −0.2249E-12 | −0.6435E-14 | 0.1093E-17 |
| S28 | 30.0000 | −0.1362E-6 | 0.2673E-12 | −0.3031E-14 | 0.8687E-18 |
| S29 | 0.5962 | −0.8033E-6 | 0.1569E-9 | −0.1920E-12 | 0.5442E-16 |
| S30 | −30.0000 | −0.6749E-6 | 0.1316E-9 | −0.1970E-12 | 0.5540E-16 |

Based on the above structures, it is determined in this embodiment that, a ratio of the focal length of the entire projection lens unit f0 with respect to the focal length of the first lens f1; f0/f1 is 0.286, and a ratio of the focal length of the second lens f2 with respect to the composite focal length of the fourth and fifth lens f45; f2/f45 is −2.45.

Figure 20:
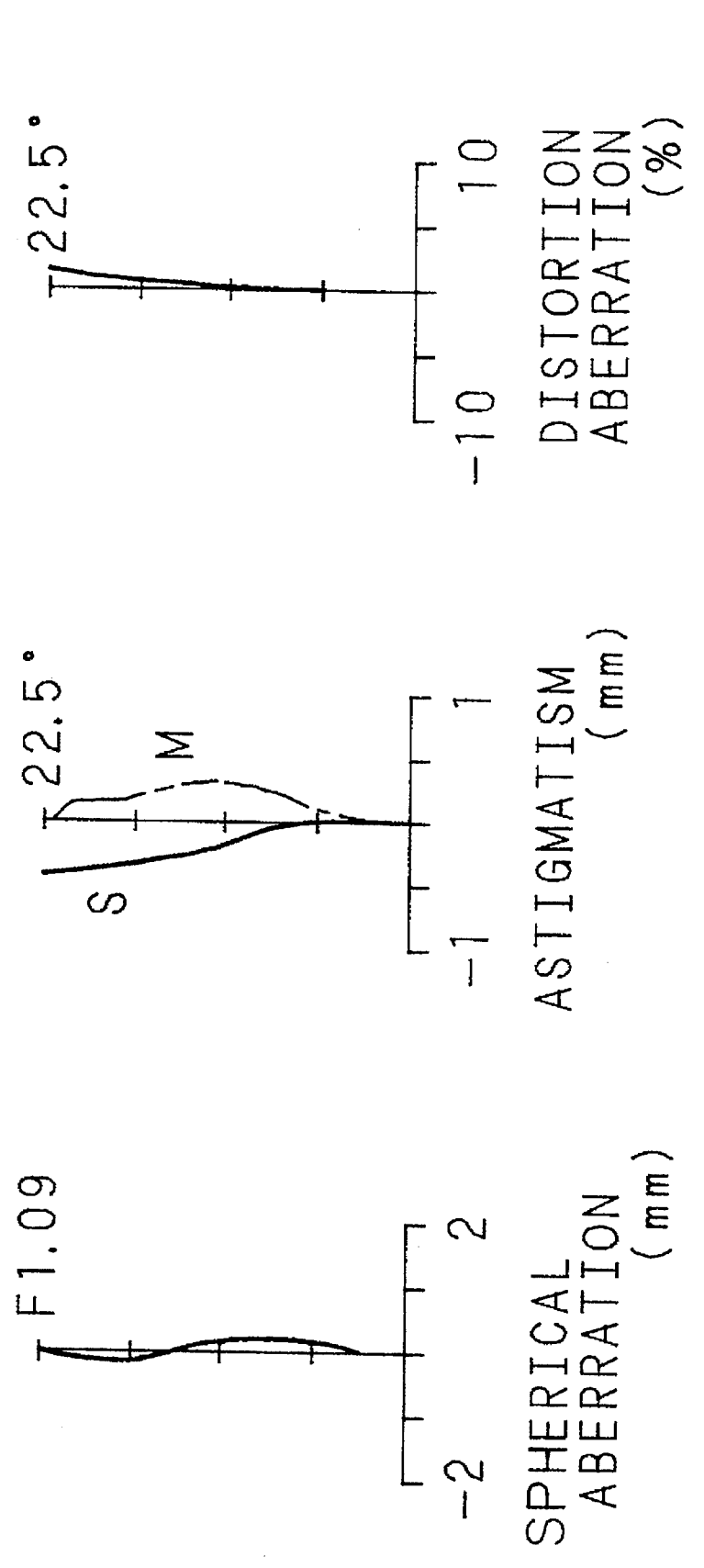
FIG. 20 shows aberration of the projection lens unit shown in FIG. 19.
Figure 21:
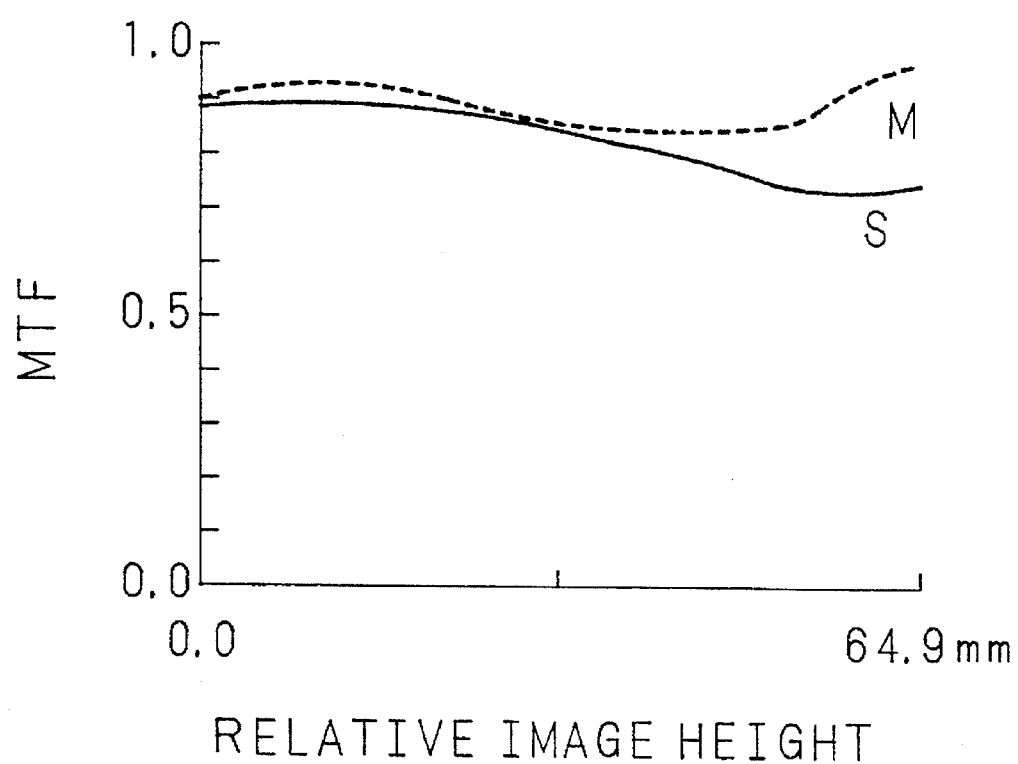
FIG. 21 shows MTF characteristics of the projection lens unit shown in FIG. 19.

FIG. 20 shows aberration of the projection lens unit shown in FIG. 19. FIG. 21 is a graph showing the MTF characteristics of the projection lens unit shown in FIG. 19. The MTF characteristics of the projection lens units in this embodiment and subsequent embodiments are represented by S (Sagittal) and M (Meridional), and particularly the calculated values at the wave length of 543 nm and the spatial frequency of 6.31 p/min.

Embodiment 8

Figure 22:
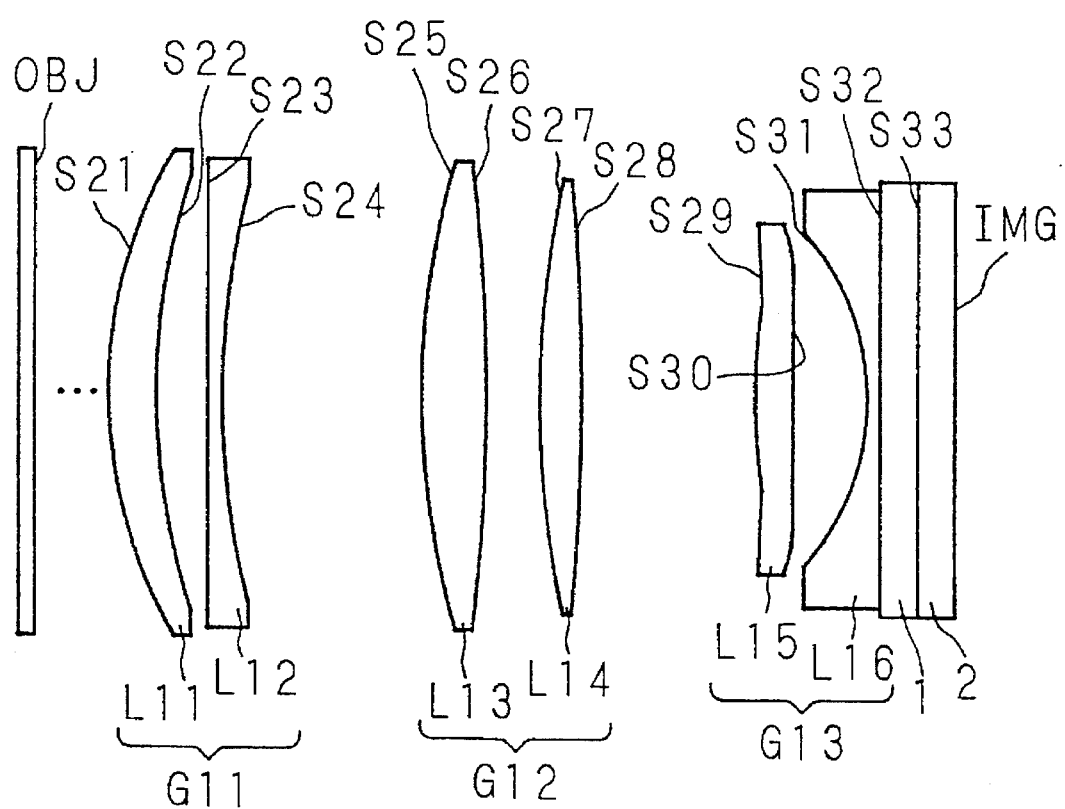
FIG. 22 shows a structure of an eighth embodiment of a projection lens unit according to the invention.
Figure 23:
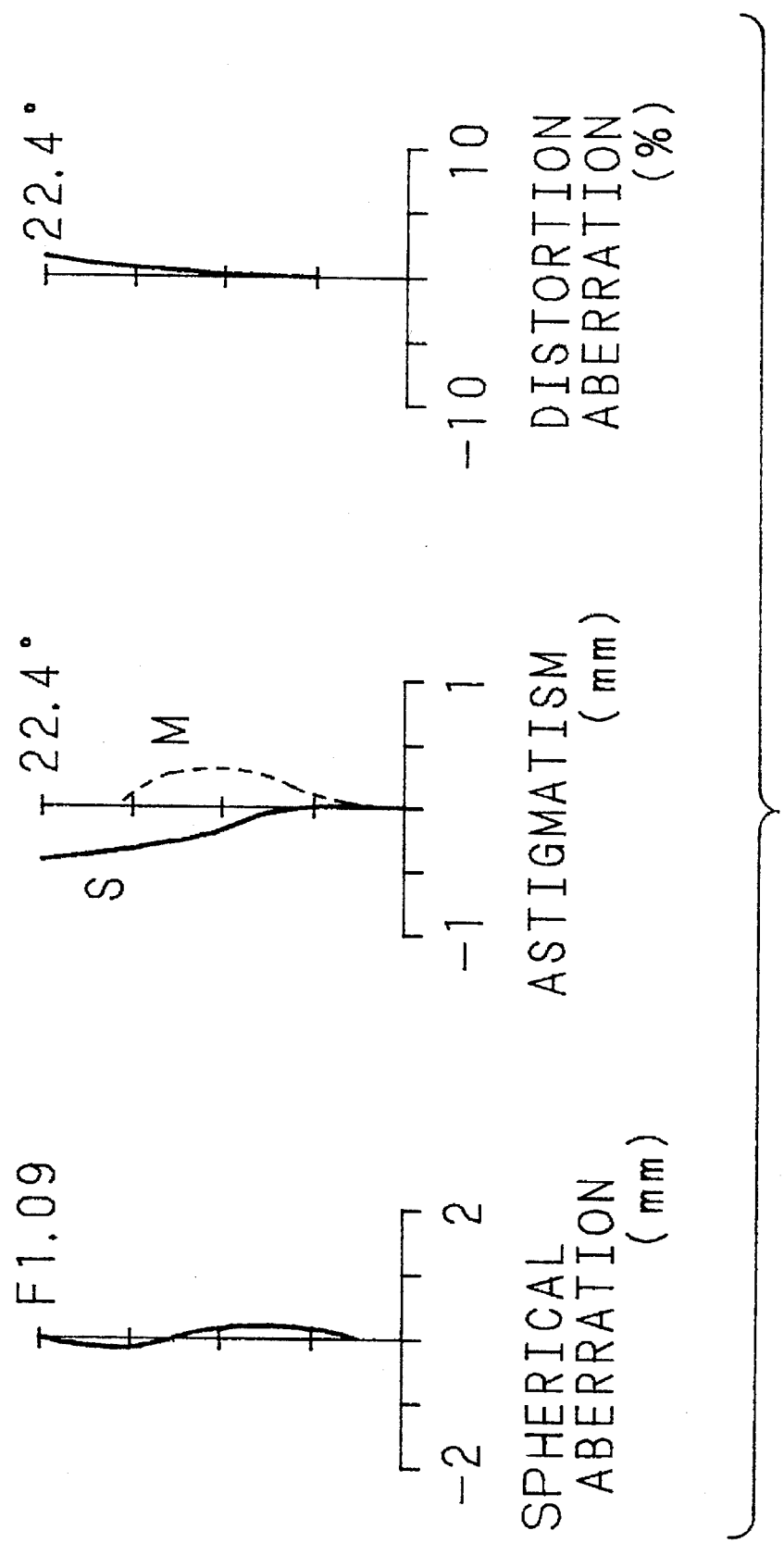
FIG. 23 shows aberration of the projection lens unit shown in FIG. 22.
Figure 24:
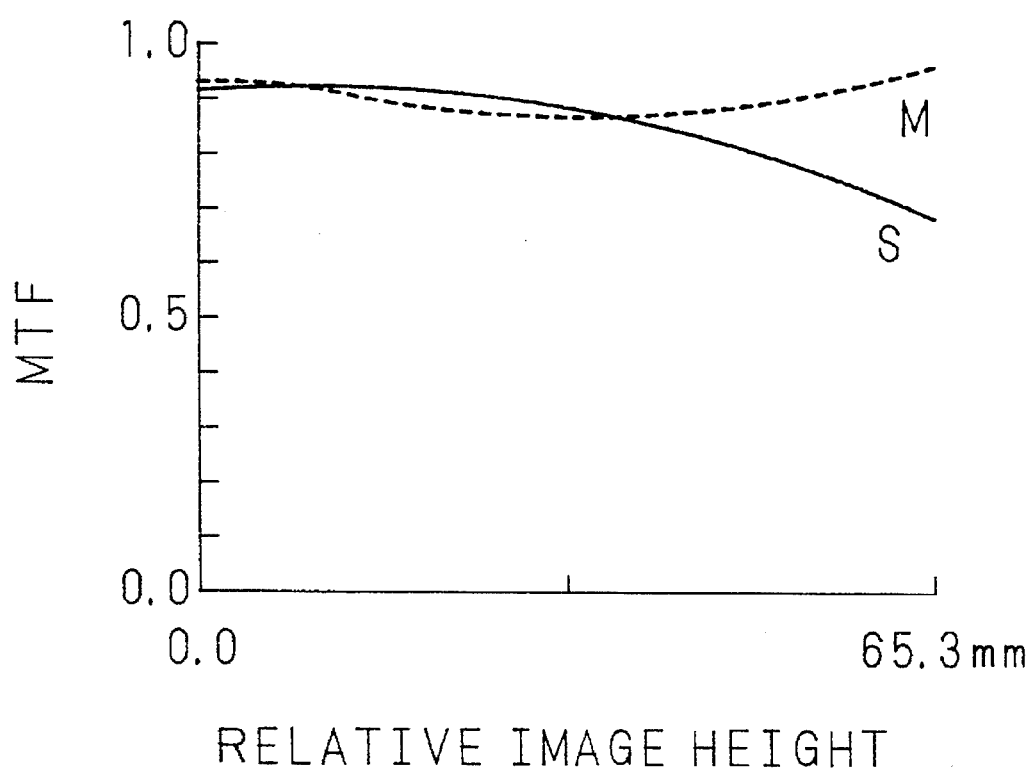
FIG. 24 shows MTF characteristics of the projection lens unit shown in FIG. 22.

FIG. 22 shows a structure of further another embodiment of the projection lens unit according to the invention. FIG. 23 shows aberration of the projection lens unit shown in FIG. 22. FIG. 24 is a graph showing MTF characteristics of the projection lens unit shown in FIG. 22. Table 16 shows radii of curvature R of lens surfaces S21–S33, surface distances I, indexes of refraction nd at d-line (587.56 nm) and main dispersion vd in this embodiment. Table 17 shows conic coefficients K and aspherical coefficients A, B, C and D at surfaces S23, S24, S27, S28, S29 and S30.

TABLE 16

| | R | I | n d | v d |
|---|---|---|---|---|
| O B J | I N F | 2979.134 | | |
| S 2 1 | 139.111 | 13.883 | 1.5891 | 61.3 |
| S 2 2 | 242.301 | 11.307 | | |
| S 2 3 | 861.722 | 4.000 | 1.4920 | 55.4 |
| S 2 4 | 245.575 | 54.710 | | |
| S 2 5 | 149.290 | 25.514 | 1.5891 | 61.3 |
| S 2 6 | −326.068 | 17.000 | | |
| S 2 7 | 227.954 | 10.661 | 1.4920 | 55.4 |
| S 2 8 | 2650.844 | 53.684 | | |
| S 2 9 | 195.047 | 9.586 | 1.4920 | 55.4 |
| S 3 0 | 590.907 | 24.224 | | |
| S 3 1 | −67.664 | 3.000 | 1.6200 | 36.3 |

TABLE 16-continued

| | R | I | n d | v d |
|---|---|---|---|---|
| S 3 2 | I N F | 11.000 | 1.3997 | |
| S 3 3 | I N F | 11.000 | 1.5374 | |
| I M G | I N F | | | |

TABLE 17

| | K | A | B | C | D |
|---|---|---|---|---|---|
| S23 | 13.9957 | 0.9391E-8 | −0.8034E-11 | −0.2511E-15 | 0.7066E-19 |
| S24 | 7.24491 | 0.1297E-6 | −0.7643E-11 | 0.6216E-15 | −0.8627E-19 |
| S27 | 3.8184 | −0.6132E-7 | −0.8261E-12 | −0.6021E-14 | 0.8440E-18 |
| S28 | −8.8269 | −0.1166E-6 | −0.2137E-12 | −0.2224E-14 | 0.6832E-18 |
| S29 | −8.6052 | −0.8375E-6 | 0.1575E-9 | −0.2366E-12 | 0.6846E-16 |
| S30 | 12.4390 | −0.8929E-6 | 0.1214E-9 | −0.2262E-12 | 0.6555E-16 |

Based on the above structures, it is determined in this embodiment that a ratio of the focal length of the entire projection lens unit f0 with respect to the focal length of the first lens f1; f0/f1 is 0.269, and a ratio of the focal length of the second lens f2 with respect to the composite focal length of the fourth and fifth lens f45; f2/f45 is −2.44.

Embodiment 9

Figure 25:
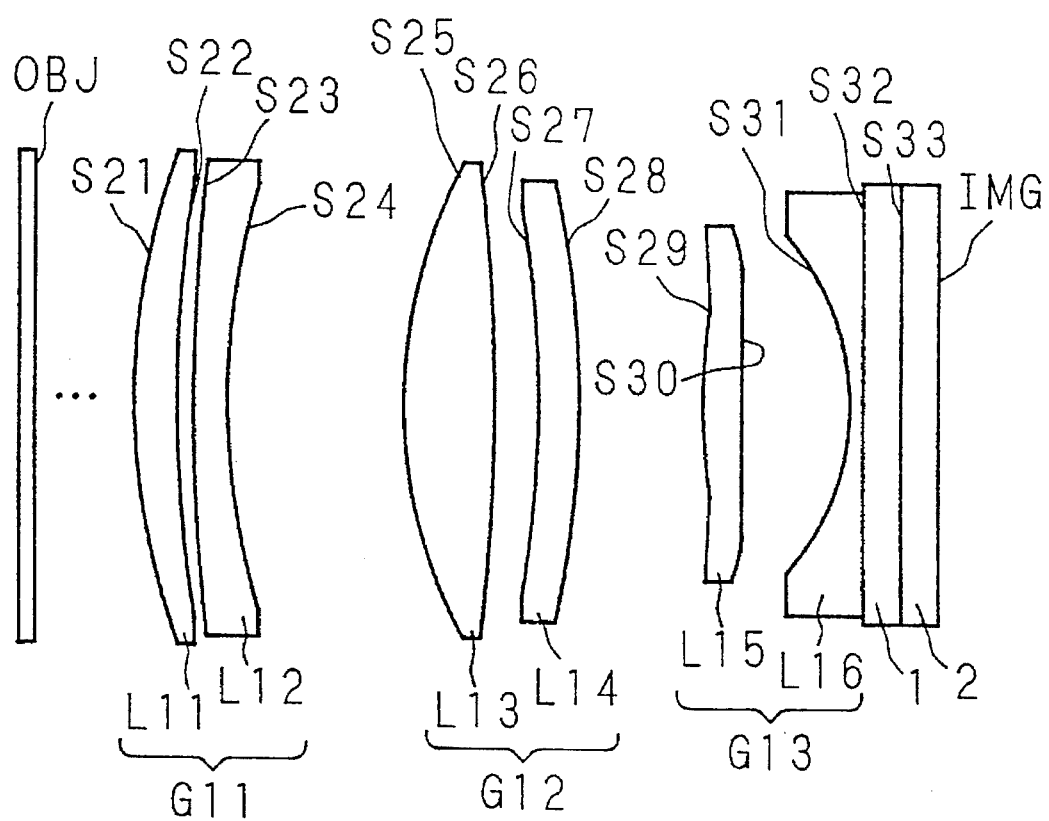
FIG. 25 shows a structure of a ninth embodiment of a projection lens unit according to the invention.
Figure 26:
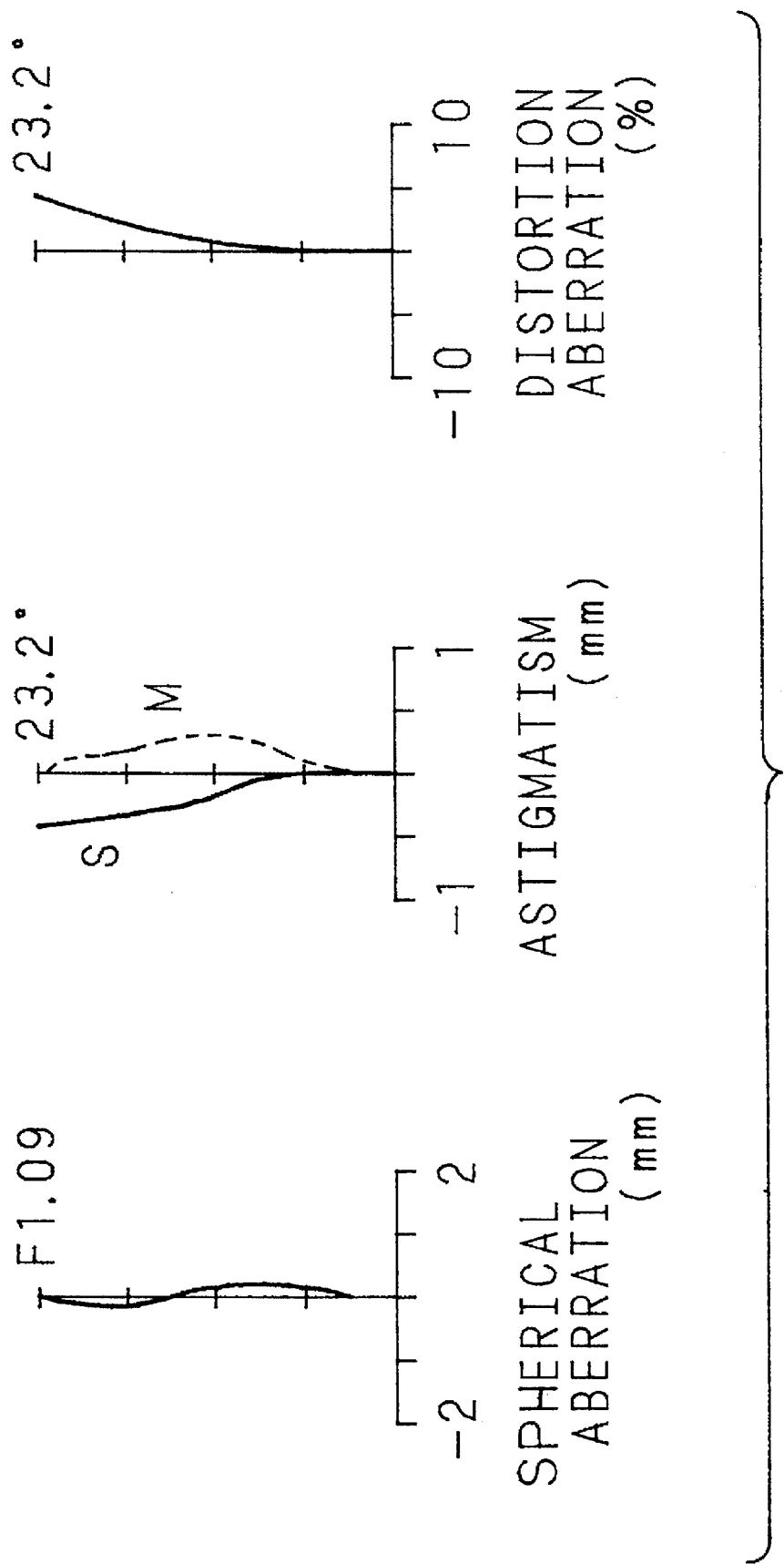
FIG. 26 shows aberration of the projection lens unit shown in FIG. 25.
Figure 27:
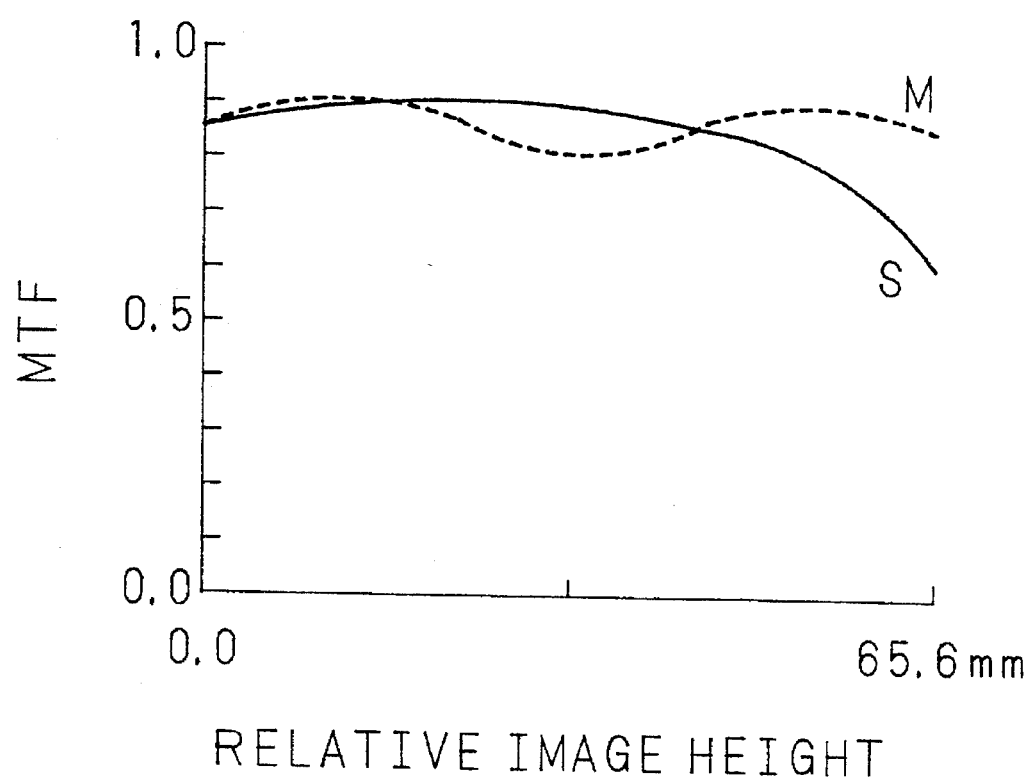
FIG. 27 shows MTF characteristics of the projection lens unit shown in FIG. 25.

FIG. 25 shows a structure of further another embodiment of the projection lens unit according to the invention. FIG. 26 shows aberration of the projection lens unit shown in FIG. 25. FIG. 27 is a graph showing MTF characteristics of the projection lens unit shown in FIG. 25. Table 18 shows radii of curvature R of lens surfaces S21–S33, surface distances I, indexes of refraction nd at d-line (587.56 nm) and main dispersion vd in this embodiment. Table 9 shows conic coefficients K and aspherical coefficients A, B, C and D at surfaces S23, S24, S27, S28, S29 and S30.

TABLE 18

|  | R | I | n d | v d |
|---|---|---|---|---|
| OBJ | INF | 2879.142 | | |
| S 2 1 | 153.137 | 11.977 | 1.5891 | 61.3 |
| S 2 2 | 271.368 | 4.341 | | |
| S 2 3 | 234.507 | 8.826 | 1.4920 | 55.4 |
| S 2 4 | 190.735 | 49.225 | | |
| S 2 5 | 131.617 | 26.200 | 1.5891 | 61.3 |
| S 2 6 | −250.442 | 15.000 | | |
| S 2 7 | −515.411 | 10.256 | 1.4920 | 55.4 |
| S 2 8 | −353.257 | 35.638 | | |
| S 2 9 | 182.555 | 9.988 | 1.4920 | 55.4 |
| S 3 0 | 812.097 | 29.549 | | |
| S 3 1 | −63.591 | 3.000 | 1.6200 | 36.3 |
| S 3 2 | INF | 11.000 | 1.3997 | |
| S 3 3 | INF | 11.000 | 1.5374 | |
| IMG | INF | | | |

TABLE 19

|  | K | A | B | C | D |
|---|---|---|---|---|---|
| S23 | −10.3063 | −0.1017E-6 | 0.2112E-10 | −0.1939E-14 | 0.5057E-19 |
| S24 | 4.0175 | −0.1052E-6 | 0.4329E-10 | −0.3533E-14 | 0.4099E-18 |
| S27 | 7.2167 | −0.2099E-6 | 0.1552E-10 | −0.1124E-13 | 0.1593E-17 |
| S28 | 26.5034 | −0.3064E-6 | 0.1732E-10 | 0.1043E-15 | 0.1015E-17 |
| S29 | −4.8797 | −0.7497E-6 | −0.8052E-10 | −0.1312E-12 | 0.2454E-16 |
| S30 | −30.0000 | −0.5194E-6 | −0.1899E-9 | −0.8096E-13 | 0.1594E-16 |

Based on the above structures, it is determined in this embodiment that a ratio of the focal length of the entire projection lens unit f0 with respect to the focal length of the first lens f1; f0/f1 is 0.235, and a ratio of the focal length of the second lens f2 with respect to the composite focal length of the fourth and fifth lens f45; f2/f45 is −5.63.

Embodiment 10

Figure 28:
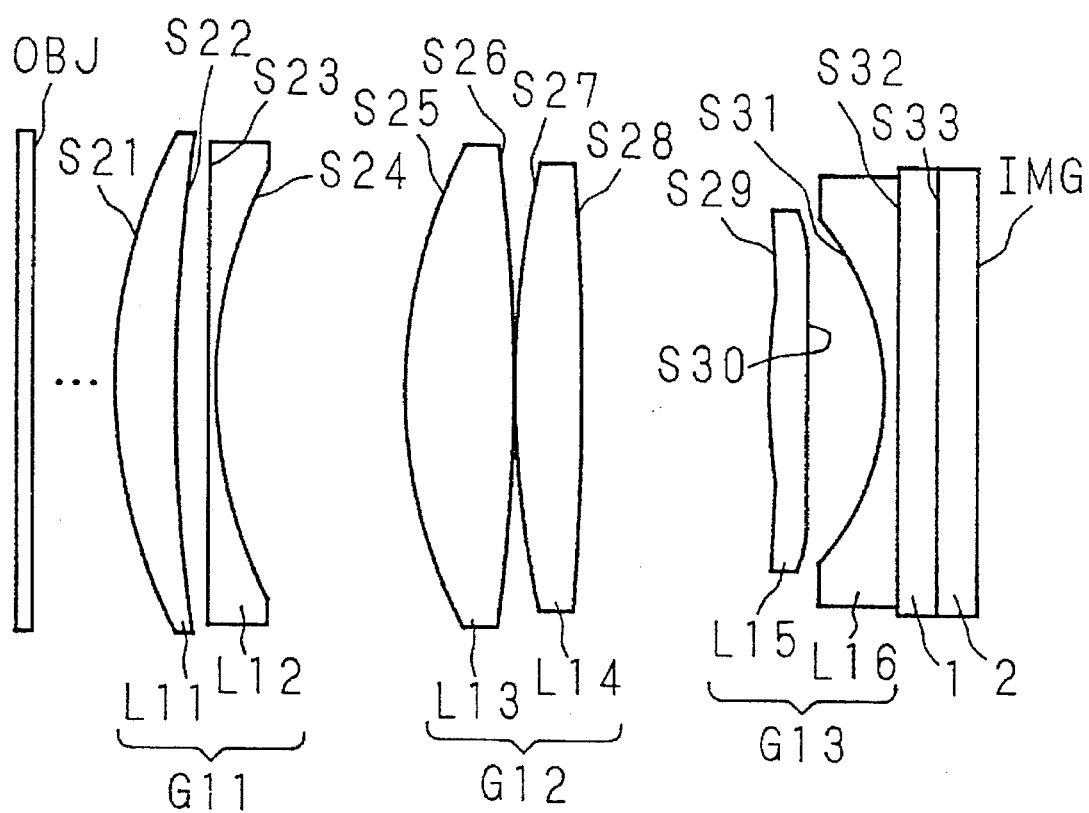
FIG. 28 shows a structure of a tenth embodiment of a projection lens unit according to the invention.
Figure 29:
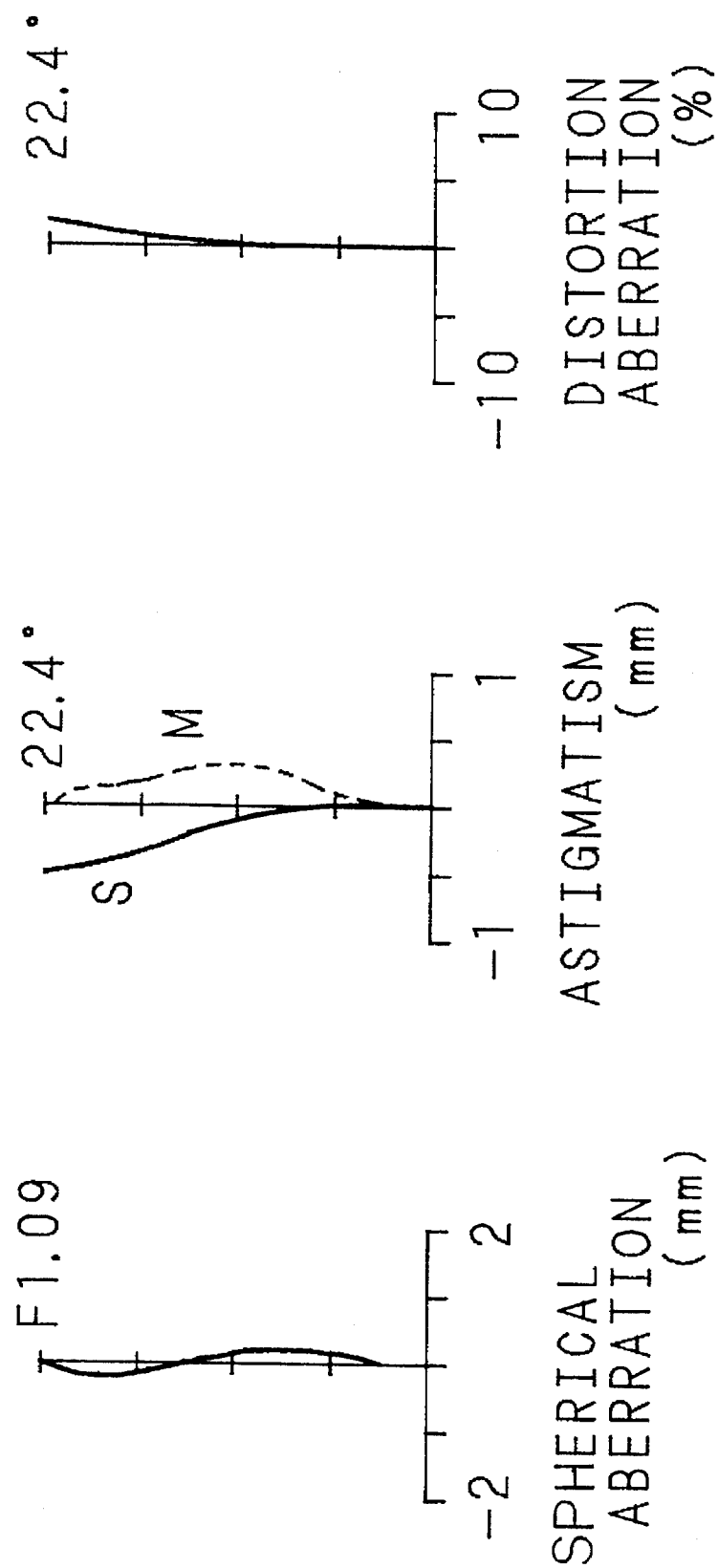
FIG. 29 shows aberration of the projection lens unit shown in FIG. 28.
Figure 30:
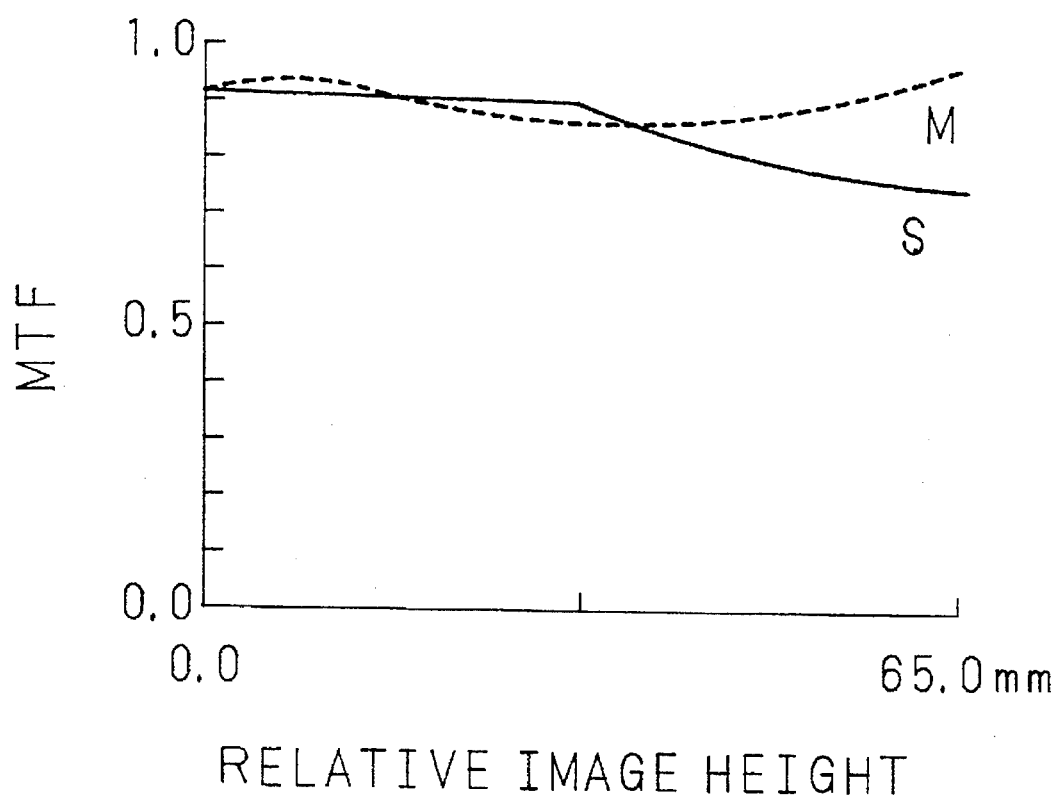
FIG. 30 shows MTF characteristics of the projection lens unit shown in FIG. 28.

FIG. 28 shows a structure of further another embodiment of the projection lens unit according to the invention. FIG. 29 shows aberration of the projection lens unit shown in FIG. 28. FIG. 30 is a graph showing MTF characteristics of the projection lens unit shown in FIG. 28. Table 20 shows radii of curvature R of lens surfaces S21–S33, surface distances I, indexes of refraction vd at d-line (587.56 nm) and main dispersion vd in this embodiment. Table 21 shows conic coefficients K and aspherical coefficients A, B, C and D at surfaces S23, S24, S27, S28, S29 and S30.

TABLE 20

|  | R | I | n d | v d |
|---|---|---|---|---|
| OBJ | INF | 2987.261 | | |
| S 2 1 | 142.442 | 15.428 | 1.5891 | 61.3 |
| S 2 2 | 302.415 | 10.548 | | |

TABLE 20-continued

|  | R | I | n d | v d |
|---|---|---|---|---|
| S 2 3 | 1931.900 | 2.444 | 1.4920 | 55.4 |
| S 2 4 | 243.670 | 53.723 | | |
| S 2 5 | 155.225 | 31.801 | 1.5891 | 61.3 |
| S 2 6 | −323.156 | 0.414 | | |
| S 2 7 | 214.780 | 18.353 | 1.4920 | 55.4 |
| S 2 8 | 1573.431 | 57.479 | | |
| S 2 9 | 210.009 | 11.288 | 1.4920 | 55.4 |
| S 3 0 | 1020.261 | 21.835 | | |
| S 3 1 | −67.039 | 5.688 | 1.6200 | 36.3 |
| S 3 2 | INF | 11.000 | 1.3997 | |
| S 3 3 | INF | 11.000 | 1.5374 | |
| IMG | INF | | | |

TABLE 21

|  | K | A | B | C | D |
|---|---|---|---|---|---|
| S23 | −10.8628 | 0.1230E-7 | −0.7304E-11 | −0.2043E-15 | 0.7120E-19 |
| S24 | 7.4604 | 0.1244E-6 | −0.6464E-11 | 0.5917E-15 | −0.7741E-19 |
| S27 | 2.5481 | −0.6974E-7 | 0.1782E-11 | −0.5095E-14 | 0.8943E-18 |
| S28 | 0.3882 | −0.1540E-6 | 0.1339E-11 | −0.1877E-14 | 0.7944E-18 |
| S29 | −9.1949 | −0.8615E-6 | 0.1643E-9 | −0.2323E-12 | 0.6802E-16 |
| S30 | 30.0000 | −0.9108E-6 | 0.1219E-9 | −0.2194E-12 | 0.6440E-16 |

Based on the above structures, it is determined in this embodiment that a ratio of the focal length of the entire projection lens unit f0 with respect to the focal length of the first lens f1; f0/f1 is 0.323, and a ratio of the focal length of the second lens f2 with respect to the composite focal length of the fourth and fifth lens f45; f2/f45 is −2.04.

Embodiment 11

Figure 31:
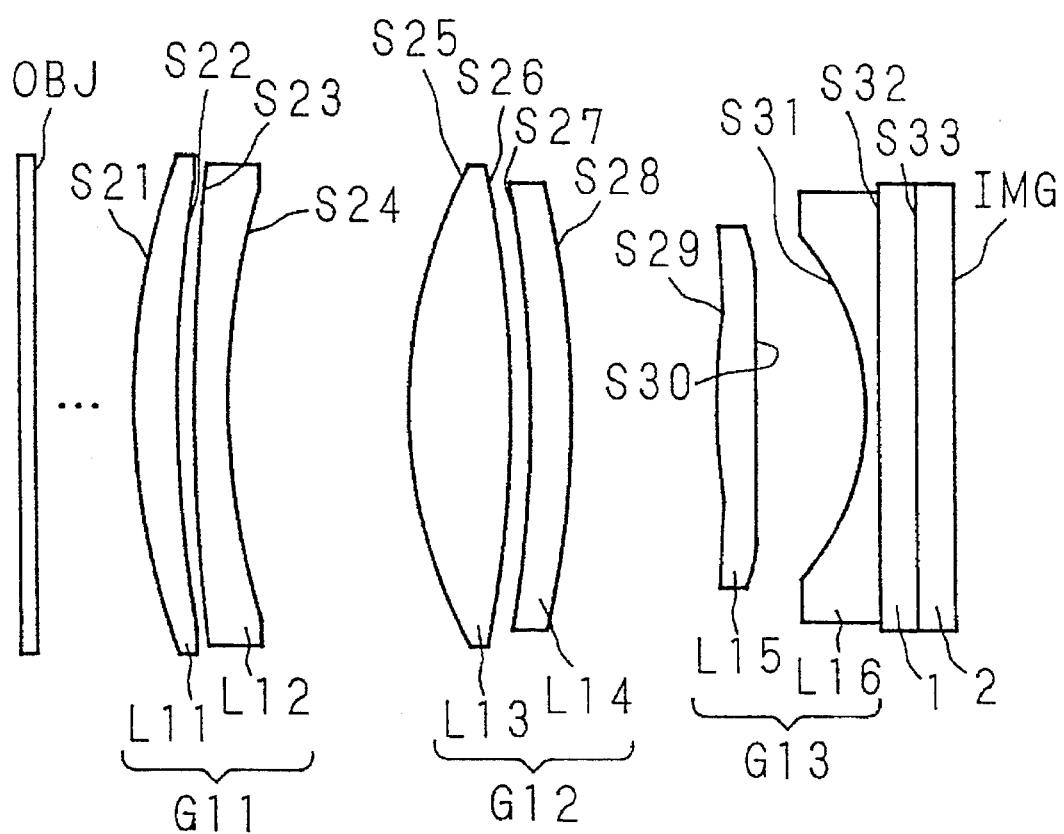
FIG. 31 shows a structure of an eleventh embodiment of a projection lens unit according to the invention.
Figure 32:
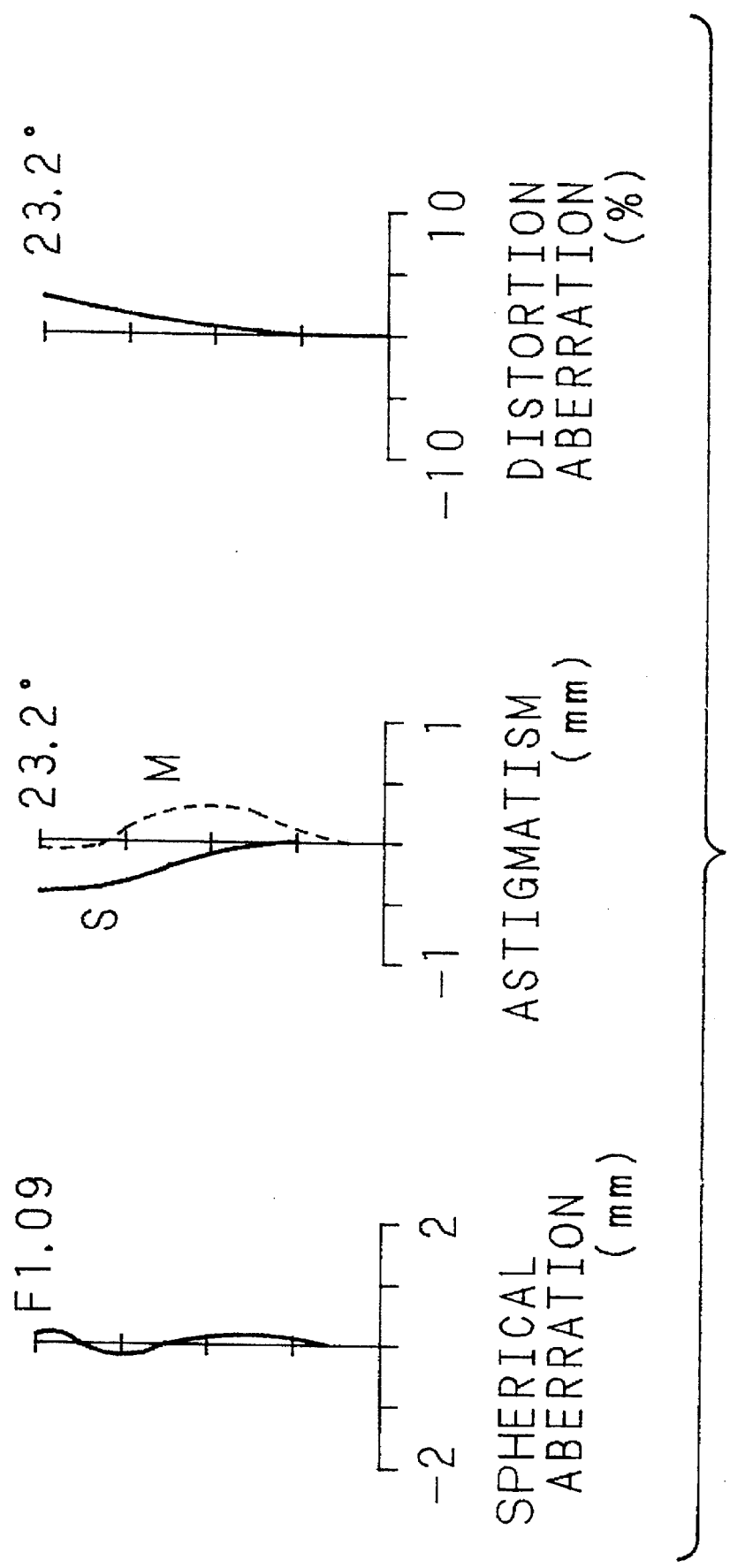
FIG. 32 shows aberration of the projection lens unit shown in FIG. 31.
Figure 33:
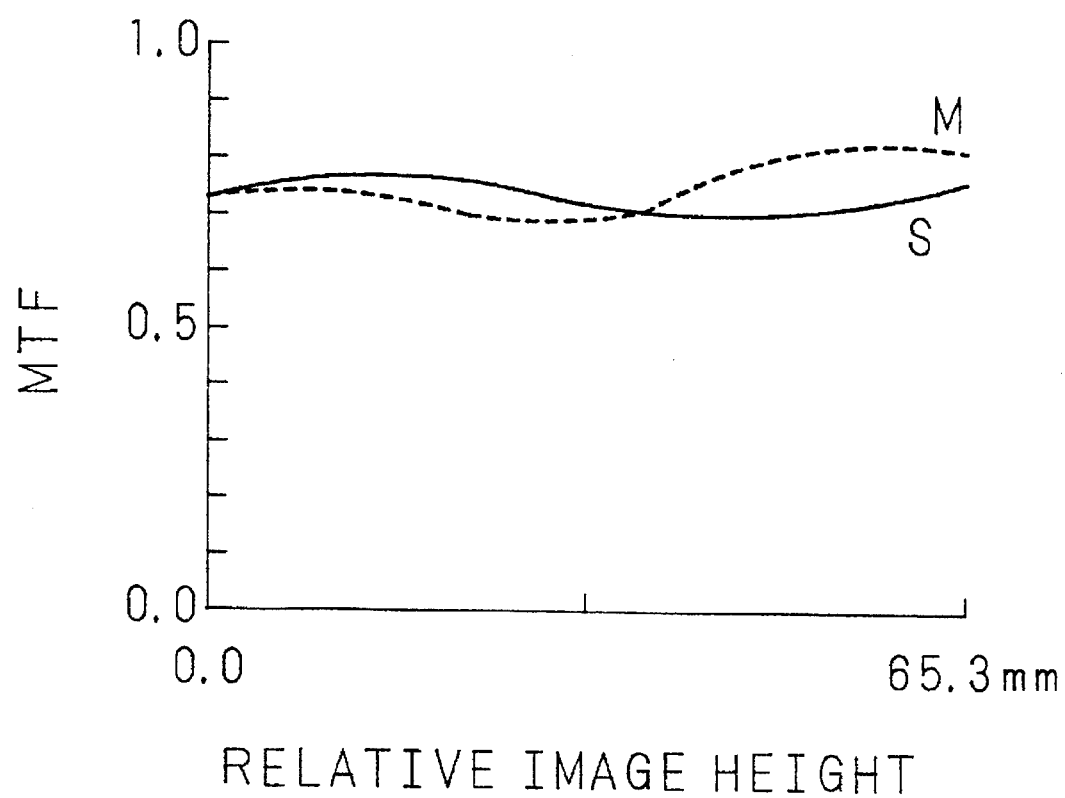
FIG. 33 shows MTF characteristics of the projection lens unit shown in FIG. 31.

FIG. 31 shows a structure of further another embodiment of the projection lens unit according to the invention. FIG. 32 shows aberration of the projection lens unit shown in FIG. 31. FIG. 33 is a graph showing MTF characteristics of the projection lens unit shown in FIG. 31. Table 22 shows radii of curvature R of lens surfaces S21–S33, surface distances I, indexes of refraction nd at d-line (587.56 nm) and main dispersion vd in this embodiment. Table 23 shows conic coefficients K and aspherical coefficients A, B, C and D at surfaces S23, S24, S27, S28, S29 and S30.

TABLE 22

| | R | I | n d | v d |
|---|---|---|---|---|
| O B J | I N F | 2878.186 | | |
| S 2 1 | 142.981 | 13.314 | 1.5891 | 61.3 |
| S 2 2 | 274.345 | 5.267 | | |
| S 2 3 | 267.111 | 7.831 | 1.4920 | 55.4 |
| S 2 4 | 192.922 | 47.464 | | |
| S 2 5 | 131.218 | 27.155 | 1.5891 | 61.3 |
| S 2 6 | −209.889 | 3.000 | | |
| S 2 7 | −357.802 | 14.206 | 1.4920 | 55.4 |
| S 2 8 | −360.643 | 39.541 | | |
| S 2 9 | 283.699 | 12.000 | 1.4920 | 55.4 |
| S 3 0 | −1821.315 | 31.220 | | |
| S 3 1 | −62.887 | 3.000 | 1.6200 | 36.3 |
| S 3 2 | I N F | 11.000 | 1.3997 | |
| S 3 3 | I N F | 11.000 | 1.5374 | |
| I M G | I N F | | | |

TABLE 23

| | K | A | B | C | D |
|---|---|---|---|---|---|
| S23 | −14.6331 | −0.9583E-7 | 0.2120E-10 | −0.2145E-14 | 0.3558E-19 |
| S24 | 4.2858 | −0.8683E-7 | 0.4186E-10 | −0.3158E-14 | 0.3689E-18 |
| S27 | 15.3319 | −0.2185E-6 | 0.7732E-11 | −0.6048E-14 | 0.1182E-17 |
| S28 | 29.1043 | −0.3261E-6 | 0.7763E-11 | 0.5587E-15 | 0.1636E-17 |
| S29 | −8.6605 | −0.7521E-6 | −0.4867E-10 | −0.9721E-13 | 0.1868E-16 |
| S30 | −30.0000 | −0.5062E-6 | −0.1386E-9 | −0.5274E-13 | 0.9794E-17 |

Based on the above structures, it is determined in this embodiment that a ratio of the focal length of the entire projection lens unit f0 with respect to the focal length of the first lens f1; f0/f1 is 0.276, and a ratio of the focal length of the second lens f2 with respect to the composite focal length of the fourth and fifth lens f45; f2/f45 is −2.97.

The projection lens units in the embodiments 7–11 have a high numerical aperture, i.e., the F-number of 1.09, in spite of the fact that it is formed of six lens of glass or plastics. Also, the projection lens units in the embodiments 7–11 can sufficiently correct the aberration through the whole image. Therefore, the projection lens unit can be suitably used for projecting the high definition image, e.g., in the high definition televisions and computer displays.

By appropriately arranging the powers, the plastic lens having aspherical surfaces can operate to cancel the changes of optical characteristics caused by the ambient conditions, and thereby can suppress degradation of the performance which may be caused by the defocus and aberration.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projection lens unit for projecting an image on a screen comprising:

a first lens having a positive meniscus form with aspherical surfaces at its opposite sides;

a second lens having a negative meniscus form;

third and fourth lens for gathering light;

a fifth lens having aspherical surfaces at its opposite sides;

a sixth lens having aspherical surfaces at its opposite sides;

a seventh lens of a meniscus form having a concave surface directed to a screen side; and an eighth lens having a concave surface facing to the screen, wherein said first, second, third, fourth, fifth, sixth, seventh and eighth lens are provided in this order from the screen side.

2. The projection lens unit according to claim 1, wherein said projection lens unit satisfies the following conditions:

$$0.08 < p1/p0 < 0.17 \quad (1)$$

$$1.00 < p8/p7 < 6.00 \quad (2)$$

wherein, p0: power of the whole projection lens unit p1: power of said first lens p7: power of said seventh lens p8: power of said eighth lens.

3. A projection lens unit for projecting an image on a screen comprising:

a first lens having a positive meniscus form;

a second lens having a negative meniscus form;

a third lens which is a double-convex lens having a light-gathering function;

a fourth lens which is a double-convex lens having a positive power;

a fifth lens having a convex central portion and a concave peripheral portion at the screen side; and a sixth lens having a concave surface directed to the screen, wherein said first, second, third, fourth, fifth and sixth lens are provided in this order from the screen, and each of said second, fourth and fifth lens has at least one aspherical surface.

4. The projection lens unit according to claim 3, wherein said projection lens unit satisfies the following conditions:

$$0.2 < f0/f1 < 0.35 \quad (3)$$

$$-5.8 < f2/f45 < -2.0 \quad (4)$$

wherein, f0 . . . focal length of the whole lens system f1 . . . focal length of said first lens f2 . . . focal length of said second lens f45 . . . composite focal length of said fourth and fifth lens.

5. The projection lens unit according to claim 3, wherein said fourth lens is a double convex lens having a light-gathering function weaker than that of said third lens.

6. A projection lens unit for projecting an image on a screen comprising:

a first lens having a positive meniscus form;

a second lens having a negative meniscus form;

a third lens which is a double-convex lens having a light-gathering function;

a fourth lens having a positive meniscus form including a concave surface facing the screen;

a fifth lens having a convex central portion and a concave peripheral portion at the screen side; and a sixth lens having a concave surface directed to the screen, wherein said first, second, third, fourth, fifth and sixth lens are provided in this order from the screen, and wherein each of said second, fourth and fifth lens has at least one aspherical surface.

* * * * *